United States Patent
Hirokane et al.

(10) Patent No.: US 7,223,505 B2
(45) Date of Patent: *May 29, 2007

(54) METHOD FOR FORMING MICROPATTERNS

(75) Inventors: Junji Hirokane, Nara (JP); Michinobu Mieda, Shiki-gun (JP); Go Mori, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/054,244

(22) Filed: Feb. 8, 2005

(65) Prior Publication Data

US 2005/0170295 A1    Aug. 4, 2005

Related U.S. Application Data

(63) Continuation of application No. 10/076,972, filed on Feb. 15, 2002, now Pat. No. 6,872,511.

(30) Foreign Application Priority Data

Feb. 16, 2001  (JP) .............................. 2001-040238
Feb. 16, 2001  (JP) .............................. 2001-040274
May 25, 2001  (JP) .............................. 2001-157128
Jun. 5, 2001  (JP) .............................. 2001-169644

(51) Int. Cl.
*G03C 5/00*     (2006.01)
*G01D 9/00*     (2006.01)

(52) U.S. Cl. .......................... 430/8; 430/320; 430/321; 430/945; 369/100; 369/284; 346/76.1

(58) Field of Classification Search ................ 430/320, 430/321, 323, 945, 269, 58; 369/100, 227, 369/284; 346/76.1
See application file for complete search history.

(56) References Cited

U.S. PATENT DOCUMENTS 4,394,661 A *  7/1983  Peeters ......................... 347/264
4,729,940 A    3/1988  Nee et al.
4,797,316 A    1/1989  Hecq et al.
6,872,511 B2 * 3/2000  Hirokane et al. ............ 430/320

FOREIGN PATENT DOCUMENTS

JP        3-63947         3/1991

* cited by examiner

*Primary Examiner*—Thorl Chea
(74) *Attorney, Agent, or Firm*—David G. Conlin; William J. Daley, Jr.; Edwards Angell Palmer & Dodge LLP

(57) ABSTRACT

A method for forming micropatterns includes forming a thin film consisting of a single layer or of plural layers on a substrate, irradiating an energy beam to the thin film to elevate the temperature of a region to a predetermined temperature or higher to thereby modify the region of the thin film, and patterning the thin film at least in such a manner to leave over the modified region.

5 Claims, 22 Drawing Sheets

METHOD FOR FORMING MICROPATTERNS

CROSS-REFERENCE TO RELATED APPLICATION

This application is related to Japanese Patent Applications Nos. 2001-040238 filed in Feb. 16, 2001, 2001-040274 filed in Feb. 16, 2001, 2001-157128 filed in May 25, 2001 and 2001-169644 filed in Jun. 5, 2001, whose priorities are claimed under 35 U.S.C. §119, and the disclosures of which are incorporated by reference in their entirety, and this application further claims priority from and incorporates by reference in its entirety as a continuation application currently pending U.S. patent application Ser. No. 10/076,972, filed Feb. 15, 2002 now U.S. Pat. No. 6,872,511 granted Mar. 29, 2005.

BACKGROUND OF THE INVENTION

1. Field of the Invention

The invention relates to a method for forming micropatterns, and in particular, it relates to a method for forming micropatterns necessary for producing an optical disk master for manufacturing optical disks and the like for recording information at high density.

2. Description of the Related Art

Recently, to realize optical disks with higher density, narrower track pitches are employed for the guide grooves and pre-pits of optical disks. The guide grooves and the pre-pits are generally formed by a so-called mastering process; i.e., the optical disk master is produced by exposure and development of a photoresist, which comprises irradiating a converged laser radiation to the photoresist coated on a glass substrate.

In this case, the optical beam spot diameter of the converged laser radiation is approximately $0.8\lambda/NA$, where $\lambda$ represents the wavelength of the laser radiation, and NA represents the numerical aperture of the objective lens for converging the laser radiation.

Conventionally, in order to realize narrower track pitches for the guide grooves and pre-pits on optical disks, the wavelength $\lambda$ of the laser radiation is shortened and the numerical aperture NA of the objective lens is increased with an aim to decrease the spot diameter of the optical beam.

Laser cutting conventionally employed for an optical disk master having coated thereon a positive type photoresist 6 is described below. FIG. 1 shows a schematically shown constitution of a conventional laser cutting.

Referring to FIG. 1, a laser radiation 2 emitted from a laser light source 1 is reflected by mirrors 3-1 and 3-2, and after the optical intensity is controlled by an optical modulator 4, the laser radiation is reflected by a down edge mirror 3-3 and is transmitted through an objective lens 5 to be convergent irradiated onto a positive-type photoresist coated on a glass substrate 7.

The glass substrate 7 is attached to a spindle motor 8. By moving the down edge mirror 3-3 and the objective lens 5 in synchronization with the rotation of the glass substrate 7 in accordance with the rotation of the spindle motor, exposure is performed on the positive-type photoresist 6 in correspondence with the spiral-like guide groove and pre-pits. After the exposure, positive-type photoresist patterns corresponding to the spiral-like guide groove and pre-pits are formed by carrying out the development of the positive-type photoresist 6.

In FIG. 2 is shown a normalized optical intensity distribution with respect to the spot diameter of the optical beam converged on a positive-type photoresist 6 of a conventional type. This shows an approximately Gaussian optical intensity distribution.

In general, the optical beam spot diameter BS is defined by the range in which the optical intensity becomes $1/e^2$ of the maximum optical intensity. The optical beam spot diameter BS depends on the wavelength $\lambda$ of the employed laser radiation 2 and the numerical aperture NA of the objective lens 5 for converging the laser radiation 2, and is approximated by ca. $0.8\times\lambda/NA$.

For instance, in case of using a Kr laser light source 1 with a laser radiation 351 nm in wavelength as the laser radiation 2, and by using an objective lens having a numerical aperture NA of 0.95, the optical beam spot diameter BS becomes 296 nm.

FIG. 3 shows the state in which latent image 9 is formed in case the positive-type photoresist 6 formed on a glass substrate 7 is exposed to an optical beam 2 having the optical beam spot diameter BS described above. On passing through the positive-type photoresist 6, the optical intensity of the optical beam 2 becomes weaker due to optical absorption, as to form a wide latent image 9 on the surface of the positive-type photoresist despite it is narrow on the glass substrate.

In FIG. 4 is shown the state in case the latent image 9 is formed by exposing neighboring guide groove with a track pitch TP approximately equal to the optical beam spot diameter BS. For instance, in case the optical beam spot diameter BS is 296 nm, the track pitch TP is 300 nm. The position of the latent image 9 corresponds to the guide groove.

In FIG. 5 is shown the state in case the latent image 9 is formed on the positive-type photoresist 6 after continuously forming spiral-like guide groove above. FIG. 6 gives a positive-type photoresist pattern 10 obtained after developing the latent image 9 shown in FIG. 5.

Referring to FIG. 6, since the optical beam spot diameter BS is approximately the same as the track pitch TP, only slight positive-type photoresist pattern 10 remains between the guide grooves 11, and, furthermore, it has been found that rectangular patterns cannot be obtained. In such a state, a slight change in optical beam intensity on cutting or a fluctuation in track pitch attributed to external oscillation considerably affects the shape of the positive-type photoresist pattern 10, and in a worst case, it has been observed to generate drop outs of the positive-type photoresist pattern 10 to make stable tracking difficult.

To circumvent such inconveniences, a wider positive-type photoresist pattern 10 is found necessary. Accordingly, an attempt has been made to form a wider positive-type photoresist pattern 10 by decreasing the intensity of the laser radiation 2 in exposing the positive-type photoresist 6.

In FIG. 7 is shown the state of a latent image obtained with a laser radiation decreased in intensity. Referring to FIG. 7, with a laser radiation 2 decreased in intensity in exposing, a V shaped groove-like latent image 9 corresponding to the optical intensity distribution of the optical beam spot is found to form, and in this case again, it has been confirmed that no rectangular positive-type photoresist pattern is formed.

Furthermore, a track pitch TP greater than, about twice, the optical beam spot diameter BS, is necessary to obtain a rectangular pattern.

Accordingly, in case a glass substrate having coated directly thereon a positive-type photoresist 6 is used for the production of an optical disk master, it has been found difficult to obtain a narrowed track pitch while retaining stable tracking performance.

Furthermore, the numerical aperture NA of the objective lens used at present is already approaching the limit, and, since laser radiation in the ultraviolet region is currently in use, it is difficult to use a laser radiation shorter in wavelength. More specifically, an objective lens with a numerical aperture NA of 0.95 is employed, and a Kr laser 351 nm in wavelength is utilized as the light source. In this case, the resulting optical beam spot diameter is about 0.3 µm, and it is unfeasible to realize a track pitch of 0.3 µm or shorter.

SUMMARY OF THE INVENTION

The invention provides a method for forming micropatterns, which comprises forming a thin film consisting of a single layer or of plural layers on a substrate, irradiating an energy beam to the thin film to elevate the temperature of a region to a predetermined temperature or higher to thereby modify the region of the thin film, and patterning the thin film at least in such a manner to leave over the modified region.

Further, this invention provides a method for forming micropatterns as claimed in claim 1, wherein said modified region is left over by forming a metallic film on the surface of the substrate, forming a resin layer on the metallic film, forming a modified layer insoluble to a development solution by elevating the temperature of a region of the resin layer to a predetermined temperature or higher by irradiating a converged optical beam to a predetermined position from above the resin layer, and selectively removing the resin layer other than the modified layer.

Furthermore, this invention provides a method for forming micropatterns as claimed in claim 1, wherein the method comprises forming a metallic film on the surface of the substrate, elevating the temperature of the metallic film to a predetermined temperature or higher by irradiating a converged optical beam to a predetermined position of the metallic film from above the metallic film, thereby forming a mixed film consisting of the metallic film and the substrate at the interface between the substrate and the metallic film whose temperature has been elevated, selectively removing the metallic film alone, and etching a region of the substrate having no mixed film formed thereon for a predetermined amount in such a manner that the mixed film and the underlying substrate are left over.

Furthermore, this invention provides a method for forming micropatterns as claimed in claim 1, wherein the method comprises forming a mask layer on a substrate, forming a metallic film on the surface of the mask layer, elevating the temperature of the metallic film to a predetermined temperature or higher by irradiating a converged optical beam to a predetermined position of the metallic film from above the metallic film, thereby forming a mixed layer consisting of the metallic film and the mask layer at the interface between the metallic film and the mask layer whose temperature has been elevated, selectively removing the metallic film, and selectively etching a region of the mask layer having no mixed layer formed thereon in such a manner that the mixed layer is left over.

Furthermore, this invention provides a method for forming micropatterns as claimed in claim 1, wherein the method comprises forming a heat-sensitive multilayer film on the surface of the substrate, forming a mixed film the heat-sensitive multilayer film by elevating the temperature to a predetermined temperature or higher by irradiating a converged optical beam from above the heat-sensitive multilayer film, and selectively removing the portion of the heat-sensitive multilayer film other than the mixed film, so that the mixed film is left over on the substrate.

Therefore, a micropattern comprising prepits and guide grooves smaller than the optical beam diameter can be produced.

In this invention, the optical beam is employed as an energy beam.

DESCRIPTION OF THE PREFERRED EMBODIMENTS

Figure 1:
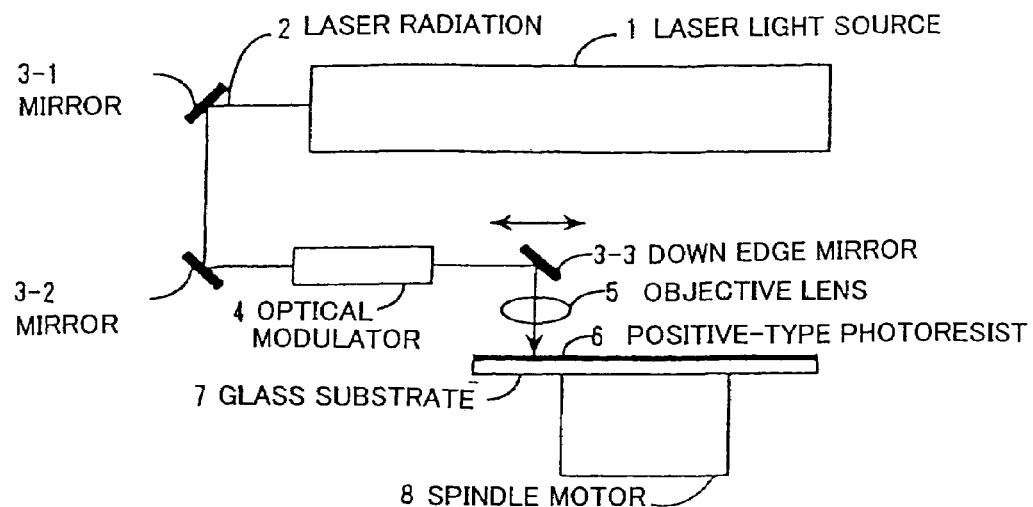
FIG. 1 is a schematically drawn constitution of a laser cutting apparatus for use in producing an optical disk master according to the invention.

The invention is described in detail with reference to the embodiments shown in the drawings. It should be understood, however, that the invention is not limited thereby.

An object of the present invention is to provide a method for forming micropatterns having guide grooves smaller than an optical beam spot diameter by yet using an objective lens and laser radiation similar to those used conventionally, and by forming on the surface of a substrate, for example, a modified resin layer, a mixed film, or the like having a narrower width.

EXAMPLE 1

Metallic Film and Resin Layer, Modified Layer

The modified layer above is preferably formed in a region smaller than the spot diameter of a convergent irradiated optical beam, and particularly preferably, the metallic film and the resin layer provide an antireflection structure with respect to the convergent irradiated optical beam. A substrate having micropatterns formed in this manner can be used as an optical disk master and the like.

The resin layer portion other than the modified layer as described above can be removed selectively by using a development solution for a positive-type photoresist, for instance, Microposit 351 manufactured by Shipley Company, L.L.C. In this instance, since the temperature of the modified layer portion is elevated to a predetermined temperature by an optical beam irradiated thereto, the positive photoresist resulted in a state of hard baked state, and made insoluble to a development solution for a positive-type photoresist.

Furthermore, with respect to the substrate having the modified layer left over, the metallic film in the region having no modified layer formed thereon may be etched by using the modified layer as a mask, and the modified layer may be selectively removed. The substrate thus obtained after etching the metallic film can be used as an optical disk master and the like.

The etching of the metallic film in this case may be carried out by dry etching.

Furthermore, after selectively removing the modified layer, the region of the substrate having no metallic film formed thereon may be etched by using the remaining metallic film as a mask, and the metallic film may be selectively removed thereafter.

Then, by using the optical disk master having the micropatterns as above, an optical disk stamper can be produced by performing so-called transfer process.

Further, an optical disk can be produced by using the optical disk stamper above and by carrying out injection molding of a resin and the formation of a recording medium and the like.

Usable as the metallic films are, for instance, Ta or Ni, but there can also be used Ti, Co, and the like. As the substrate, there can be used glass, silicon, plastics, and the like. A positive-type photoresist can be used as the resin layer.

A conventional laser cutting apparatus as shown in FIG. 1 is also usable as the laser cutting apparatus for use in the production of an optical disk master according to the invention.

Conventionally used was a glass substrate having directly formed thereon a positive-type photoresist 6. In the invention, however, used is a glass substrate 7 having formed thereon a metallic film.

According to the invention, an optical disk master having micropatterns is produced by a method as follows.

The example below refers to an optical disk of a land recording method or a groove recording method, in which the micropatterns formed on the surface of the substrate comprise a pair of an indented portion and a protruded portion to constitute a single track, and in which the information is recorded in either of the indented portion or the protruded portion. According to this method, the length corresponding to the sum of the width of a pair of indented portion and protruded portion is the track pitch TP.

Figure 8:
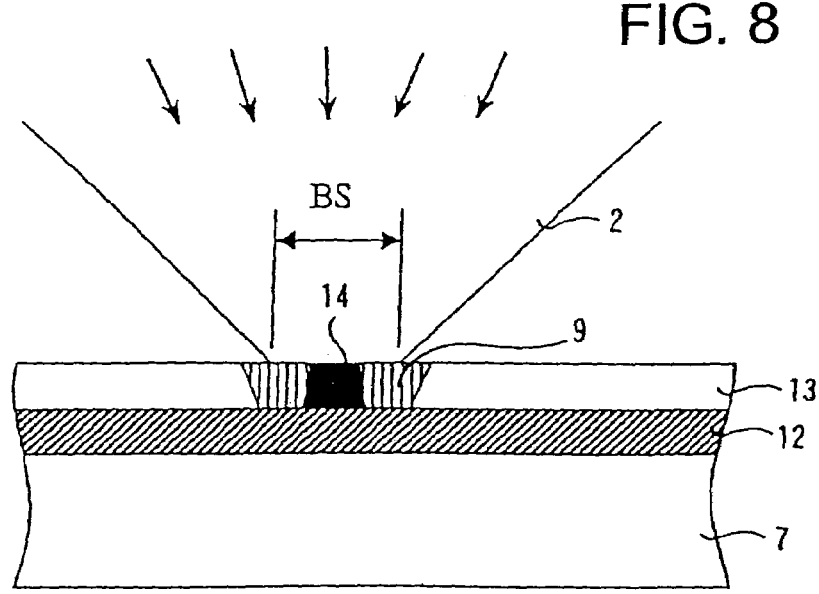
FIG. 8 is a cross section view provided to explain an exposure process of an embodiment of a method for producing an optical disk master according to the invention.

In FIG. 8 is given a schematically drawn explanatory diagram for laser cutting according to the production method for an optical disk master of the invention.

As the optical disk master, there is used a substrate 7 made of glass (quartz), silicon, and the like, having formed thereon in this order, a metallic film 12 (made of, e.g., Ta) and a positive-type photoresist 13.

In this case, the film thickness of the positive-type photoresist 13 should be set as such that it exhibits an antireflective effect with respect to the laser radiation 2 used for the exposure. For instance, the film thickness w of a preferred positive-type photoresist 13 can be expressed by $w=(m\lambda)/(4n)$, where $\lambda$ represents the wavelength of the laser radiation 2, n represents the refractive index of the positive-type photoresist 13, and m is an odd number.

Figure 9:
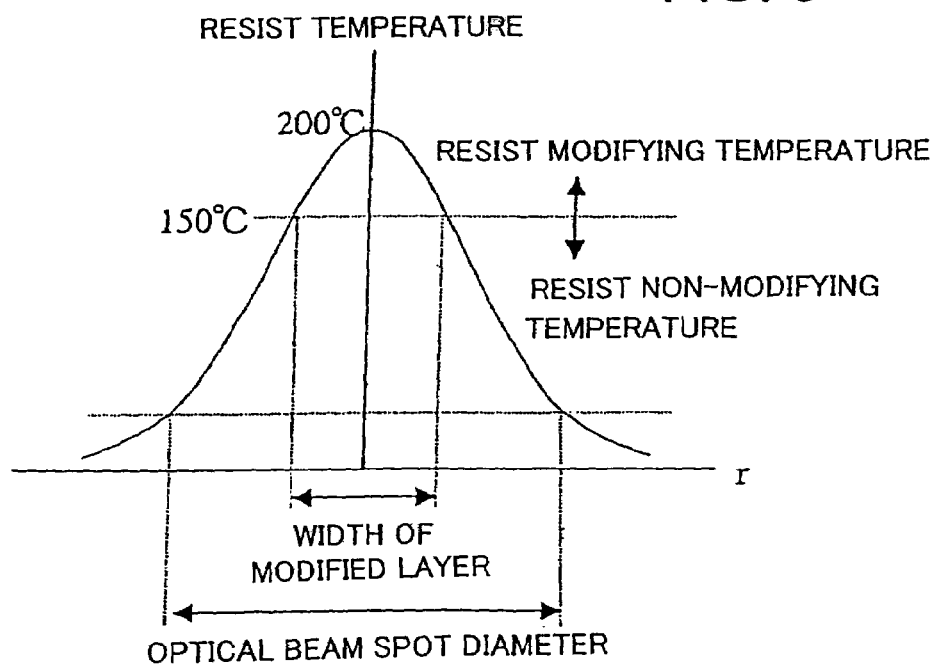
FIG. 9 is an explanatory drawing of a temperature distribution at the boundary with respect to an optical beam spot diameter according to the invention.

By thus providing a positive-type photoresist 13 with an antireflection structure formed on the metallic film 12, the optical beam 2 is absorbed by the metallic film 12 and the positive-type photoresist 13. In case the optical beam is absorbed by the positive-type photoresist 13, a Gaussian temperature distribution corresponding to the intensity distribution of the optical beam 2 results in the positive-type photoresist 13. In FIG. 9 is shown an example of a temperature distribution with respect to the spot diameter of the optical beam irradiated to the positive-type photoresist.

In this instance, the positive-type photoresist 13 is modified with elevated temperature; for example, in a region elevated in temperature to 150° C., a resin layer insoluble to a development solution is formed.

For instance, FIG. 9 shows a temperature distribution in case the optical beam spot diameter BS is set to 300 nm. In this case, the temperature distribution yields a peak of 200° C. in the positive-type photoresist 13, and the width of the region having its temperature elevated to 150° C. or higher, i.e., the width of the modified layer, is about 100 nm. The critical temperature for initiating modification (which is referred to hereinafter as modification temperature) of the positive-type photoresist 13 is 150° C.

Since the positive-type photoresist 13 in the portion of a region remaining at a temperature of 150° C. or lower does not undergo a distinguished modification, it is removed by development in the subsequent process steps. The term "modification" as referred herein signifies that the positive-type photoresist undergoes a chemical change rendered insoluble when immersed in the development solution for the positive-type photoresist 13.

FIG. 8 shows a state in which a latent image is formed in the positive-type photoresist 13 in case laser cutting is performed under the presence of the temperature distribution. A positive-type photoresist modified layer 14, whose temperature is elevated to 150° C. or higher, is formed at the central portion of the optical beam spot, and a developable latent image 9 is formed in the peripheral region. The width of the positive-type photoresist modified layer 14 is smaller than the optical beam spot diameter BS. The formation of such a modified layer 14 with a minute width was confirmed through observation of the developed pattern under electron microscope.

Figure 2:
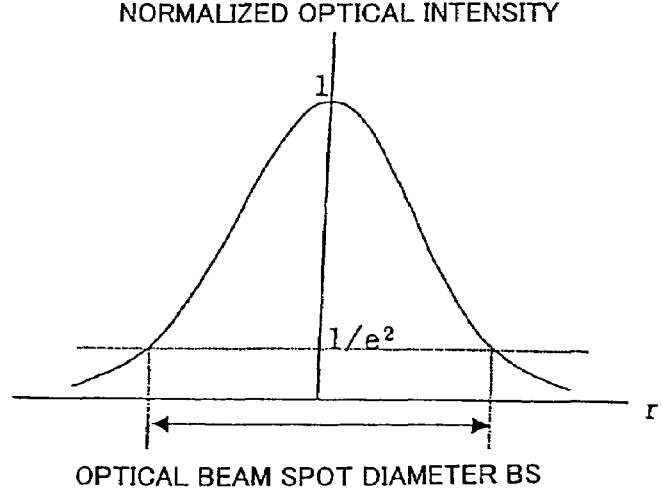
FIG. 2 is an explanatory diagram showing a normalized optical intensity distribution with respect to a converged optical beam spot diameter.
Figure 3:
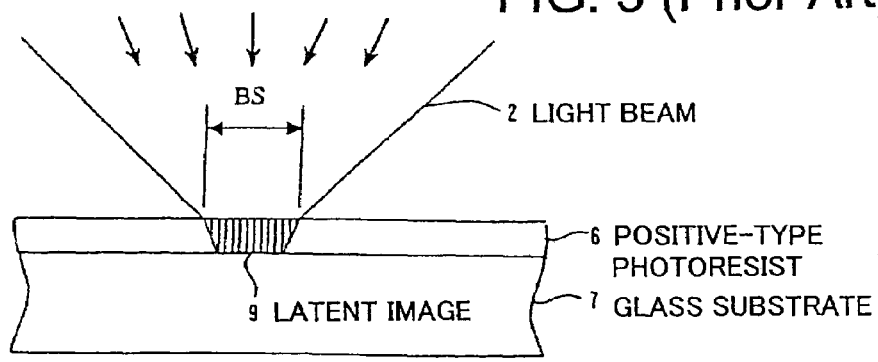
FIG. 3 is a cross section view provided to explain an exposure process in a conventional laser cutting.
Figure 4:
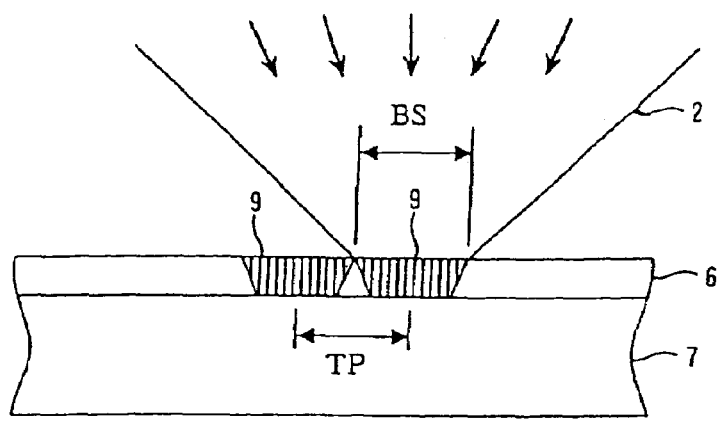
FIG. 4 is another cross section view provided to explain an exposure process in a conventional laser cutting.
Figure 5:
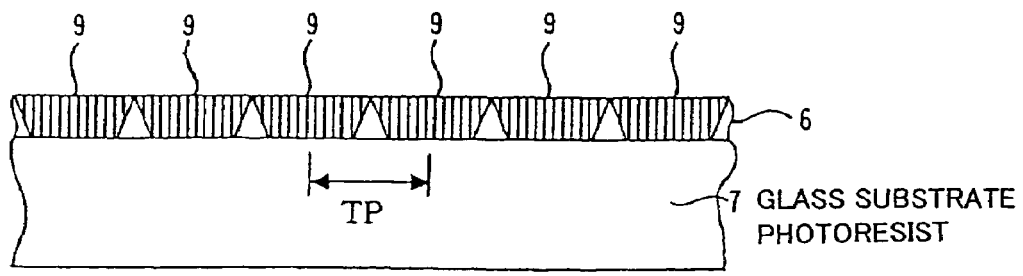
FIG. 5 is still other cross section view provided to explain an exposure process in a conventional laser cutting.
Figure 6:
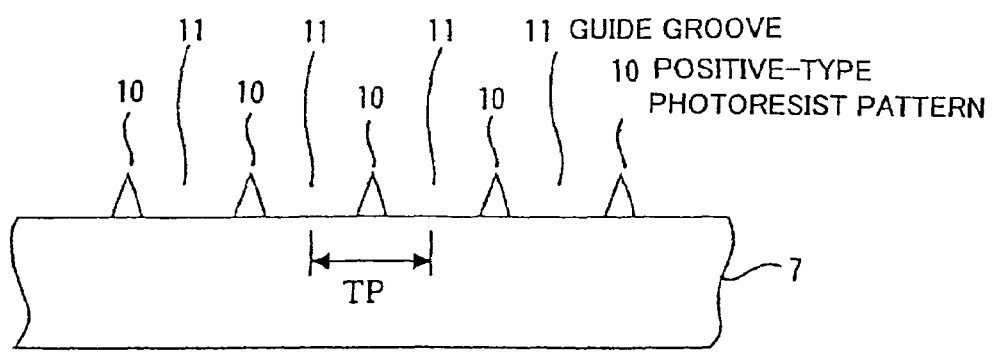
FIG. 6 is cross section view of a positive-type photoresist pattern formed by a conventional laser cutting.
Figure 7:
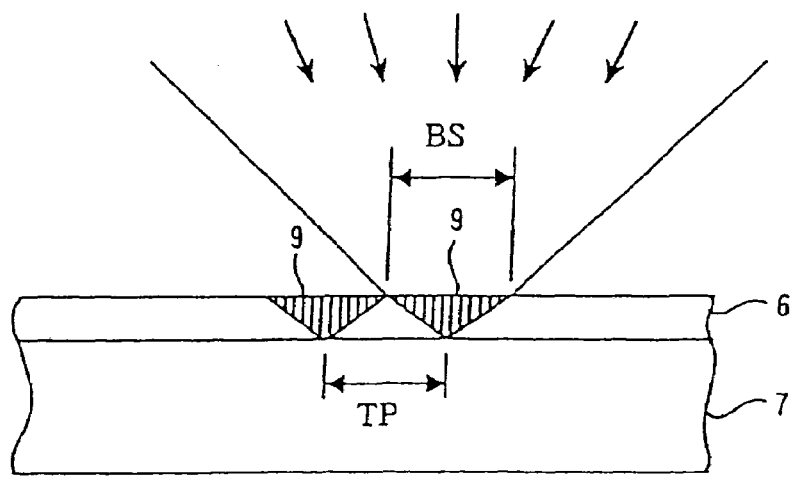
FIG. 7 is a cross section view provided to explain an exposure process in a conventional laser cutting.

Referring to FIG. 2, it can be understood that laser radiation 2 with a certain degree of intensity is irradiated to the region outside the range of the optical beam spot diameter BS; hence, in case an optical beam 2 with an intensity capable of elevating the temperature of the positive-type photoresist 13 is irradiated, the latent image 9 is formed over a range wider than the optical beam spot diameter BS.

Figure 10:
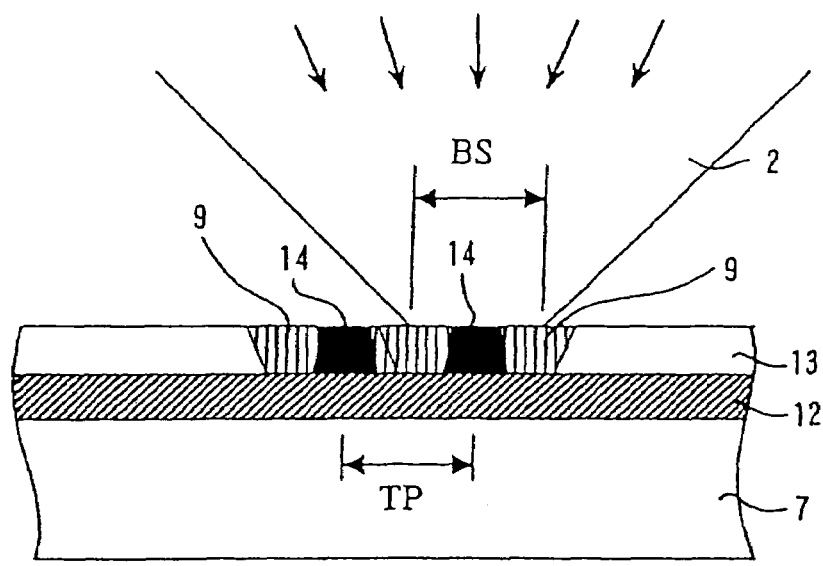
FIG. 10 is a cross section view provided to explain an exposure process of an embodiment of a method for producing an optical disk master according to the invention.

In FIG. 10 is shown a cross section shape in case exposure is performed to the neighboring track with a track pitch TP almost equivalent to that of the optical beam spot diameter BS. In this case, the positive-type photoresist modified layer 14 is formed separated in the direction of the track, and is superposed on the latent images 9 of the neighboring tracks.

Figure 11:
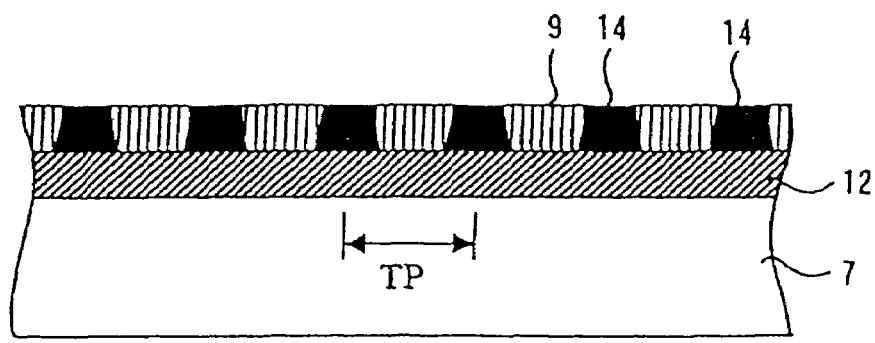
FIG. 11 is a cross section view provided to explain an exposure process of an embodiment of a method for producing an optical disk master according to the invention.

FIG. 11 shows a cross section shape in case the laser cutting above is performed continuously to implement a spiral-like laser cutting. In the positive-type photoresist 13, a positive-type photoresist modified layer 14 and a latent image 9 are aligned alternately. The continuous cutting is carried out by gradually moving the down edge mirror 3-3 and the objective lens 5 shown in FIG. 1.

Figure 12:
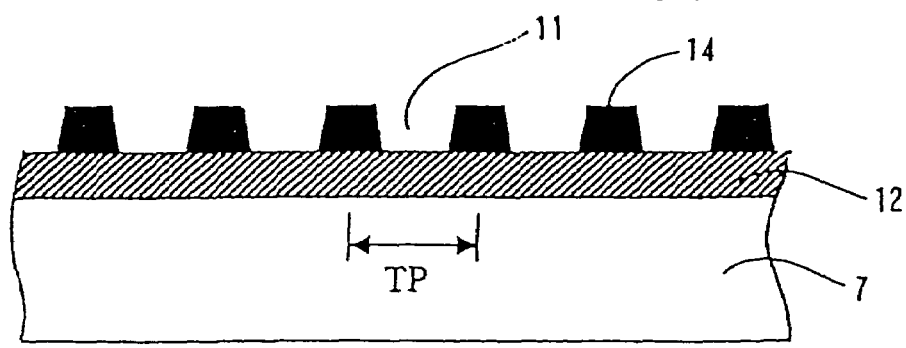
FIG. 12 is a cross section view provided to explain a state after latent image is removed in accordance with the invention.

FIG. 12 shows a cross section shape obtained after developing the positive-type photoresist 13 in the state shown in FIG. 11 by using a developing solution. The positive-type photoresist 13 corresponding to the portion of the latent image 9 alone is removed, and a guide track 14 made of positive-type photoresist modified layer 14 is formed. The potion between the guide tracks 14 provides a guide groove 11. The structure shown in FIG. 12 can be used as an optical disk master.

Subsequently, in a state shown in FIG. 12, the portion of the metallic film 12 having no modified layer 14 formed thereon is etched by using the positive-type photoresist modified layer 14 as a mask. The etching can be performed by using wet etching or dry etching.

Figure 13:
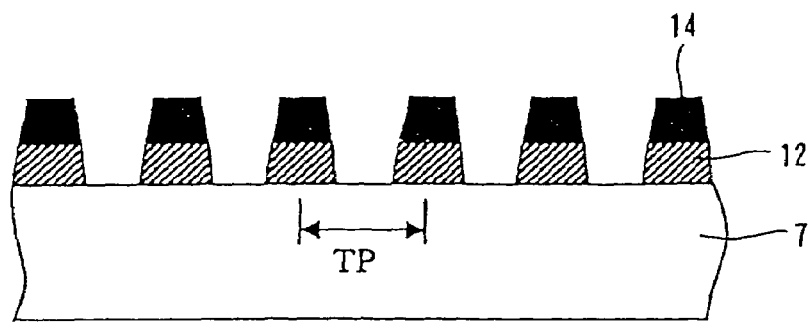
FIG. 13 is a cross section view provided to explain a state in which a metallic film having no modified photoresist layer formed thereon is etched in accordance with the invention.

FIG. 13 shows a cross section shape obtained after etching the metallic film 12. Referring to FIG. 13, a rectangular guide track made of a laminate comprising the positive-type photoresist modified layer 14 superposed on the metallic film 12 is formed at a track pitch TP of about 300 nm.

Figure 14:
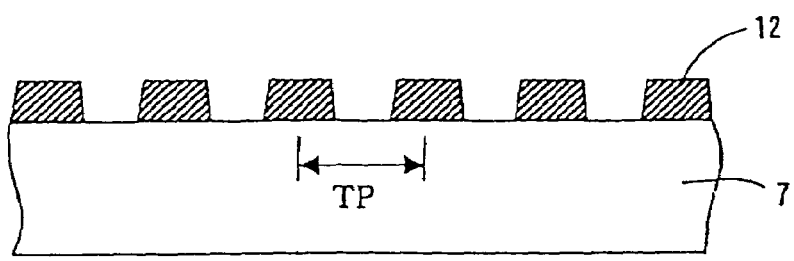
FIG. 14 is a cross section view provided to explain a state after modified photoresist layer is removed in accordance with the invention.

FIG. 14 shows a structure obtained after removing the positive-type photoresist modified layer 14 by using a positive-type photoresist remover or an organic solvent. In this manner, a glass substrate 7 having a structure comprising guide tracks made of metallic film 12 arranged with an interval of the track pitch TP is obtained. The structure shown in FIG. 14 can also be used as an optical disk master.

Figure 15:
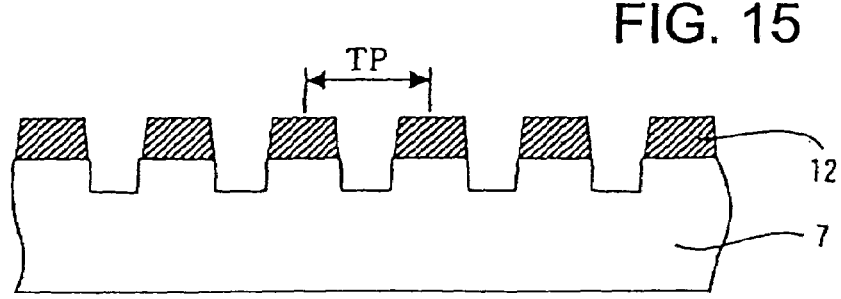
FIG. 15 is a cross section view provided to explain a state in which a surface of a substrate region having no metallic film formed thereon is etched in accordance with the invention.
Figure 16:
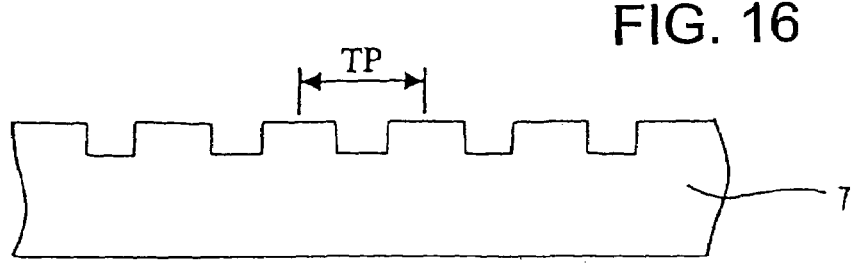
FIG. 16 is a diagram showing a finished optical disk master obtained by a production process according to the invention.

Subsequently, the portion of the glass substrate 7 having no metallic film 12 formed thereon is etched by using the metallic film 12 as a mask. In FIG. 15 is shown a state obtained after etching the substrate 7. FIG. 16 shows a structure obtained after removing the metallic film 12 by using an acid (e.g., hydrochloric acid, sulfuric acid, and nitric acid) capable of dissolving the metallic film 12. Referring to FIG. 16, a structure comprising a glass substrate 7 having formed directly thereon a guide track consisting of indented and protruded portions is realized. The pitch of the guide track is equal to the track pitch TP. The structure shown in FIG. 16 can also be used as an optical disk master.

The optical disk master thus finished comprises protruded portions as guide tracks, and since the pitch thereof is formed at a narrow track pitch TP nearly equal to the optical beam spot BS, an optical disk suitable for high density recording and having improved stability in tracking performance can be implemented by using the optical disk master thus obtained.

The process for producing an optical disk from the optical disk masters finished by the production processes above is described below. Specifically, a process for producing an optical disk by using the optical disk master shown in FIG. 14 is explained below.

Figure 20:
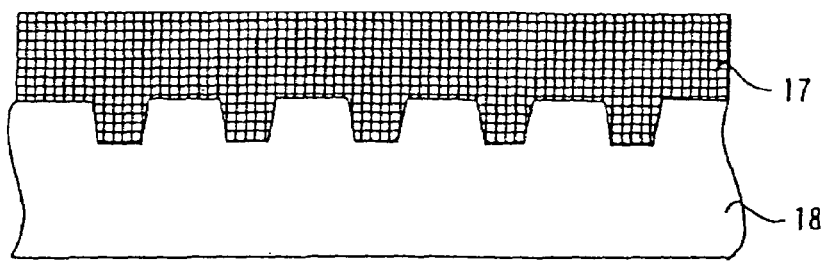
FIG. 20 is a cross section view provided to explain a state in which a resin optical disk substrate is produced from a stamper according to the invention.
Figure 21:
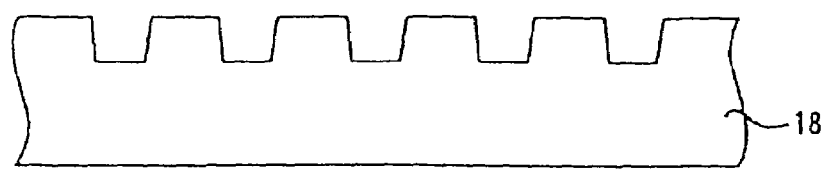
FIG. 21 shows a finished optical disk substrate produced according to the invention.
Figure 22:
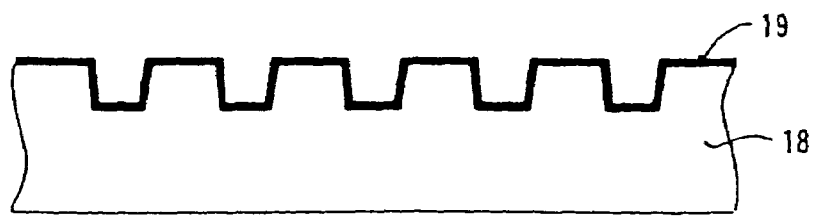
FIG. 22 is a cross section view provided to explain a state in which a recording medium is formed on an optical disk substrate according to the invention.

In the following, the cross section states of the disk are shown. More specifically, FIG. 17 shows the process step for forming an electrode film, FIG. 18 shows a step for forming an Ni electrocasting, FIG. 19 shows a step for forming a stamper by stripping off, FIG. 20 shows a step for molding a resin optical disk substrate, FIG. 21 shows a step for finishing the optical disk substrate, and FIG. 22 shows a step for forming a recording medium.

Figure 17:
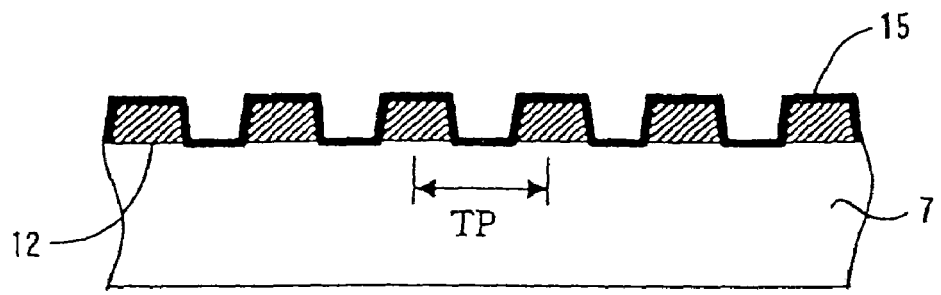
FIG. 17 is a cross section view provided to explain a state in which an electrode film is formed on an optical disk master according to the invention.

Firstly, as shown in FIG. 17, an electrode film 15 to provide an electrode for electrocasting is formed on the surface of the optical disk master by means of sputtering and the like. As the electrode film material, preferred is to use a metal such as Ni, Ta, stainless steel, and the like. Further, to facilitate the stripping off of the stamper from the electrode film 15 in the later step of stripping off the stamper, the surface of the electrode film is subjected to oxidation treatment by means of ashing and the like.

Figure 18:
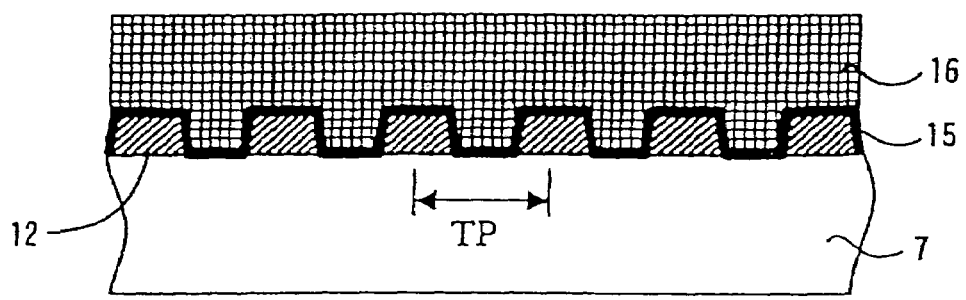
FIG. 18 is a cross section view provided to explain a state in which an Ni electrocasting film is formed on an optical disk master according to the invention.

Then, as shown in FIG. 18, an Ni electrocasting film 16 is formed by carrying out electrocasting of Ni using the electrode film 15 as the electrode.

Figure 19:
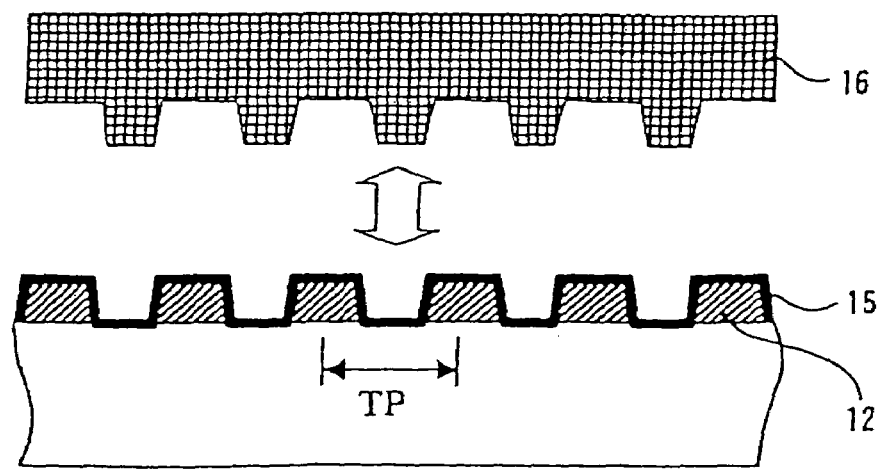
FIG. 19 is a cross section view provided to explain a state in which an Ni electrocasting film is stripped off from an optical disk master according to the invention.

Subsequently, as shown in FIG. 19, after stripping off the Ni electrocasting film 16 from the electrode film 15, the back plane (the side having the indentations and protrusions as shown in FIG. 17) of the Ni electrocasting film is subjected to polish treatment. The Ni electrocasting film 16 thus subjected to polish treatment provides a stamper 17.

As shown in FIG. 20, the stamper 17 is attached to an injection molding machine, and by injection molding a resin such as polycarbonate, a resin optical disk substrate 18 can be obtained as shown in FIG. 21.

Finally, as shown in FIG. 22, a recording medium 19 is formed on the plane of the optical disk substrate 18 having formed thereon the guide track (i.e., the surface of the substrate having the indentations and protrusions) to obtain a finished optical disk.

The recording medium 19 referred herein is a so-called structured layer consisting of plural layers for recording data; for instance, it may comprise a transparent dielectric layer, a recording layer, a transparent dielectric layer, and a reflection layer laminated in this order.

Thus, the optical disk produced in this manner comprises a rectangular guide track (the protruded portion formed on the surface of the disk shown in FIG. 22) formed at a track pitch TP (e.g., 300 nm) nearly equal to the optical beam spot diameter BS used for laser cutting. Since a rectangular guide track is formed, an optical disk suitable for high density recording and having improved stability in tracking performance can be implemented with high precision by using the optical disk master produced in this manner.

Examples of the optical disk masters and the methods for producing optical disk masters and the like according to the invention are described below.

EXAMPLE 1-1

On a glass substrate 7, Ta film was formed at a film thickness of 40 nm as a metallic film 12, and S1400 positive-type photoresist produced by Shipley Company, L.L.C., was formed thereon at a film thickness of 50 nm to provide a positive-type photoresist 13. These films can be formed by spin coating.

Subsequently, laser cutting was performed. More specifically, a laser radiation 2 emitted at a wavelength of 351 nm from a Kr laser light source 1 was converged and irradiated to the surface of the positive-type photoresist 13 by using an objective lens 5 having a numerical aperture NA of 0.95. The optical beam spot diameter BS of the converged laser radiation 2 was found to be approximately 300 nm.

Then, laser cutting was performed at a track pitch TP of 300 nm and at a laser power intensity of 4 mW. The metallic film 12 and the positive-type photoresist 13 provide an antireflective structure with respect to a laser radiation 351 nm in wavelength. Thus was obtained a latent image 9 and a positive-type photoresist modified layer 14 structure as shown in FIG. 11 in this process step.

The latent image 9 and the positive-type photoresist modified layer 14 each had a pitch corresponding to the track pitch TP (=300 nm). The width of the latent image 9 in the lateral direction as observed on the paper sheet plane was found to be about 180 nm, and that of the positive-type photoresist modified layer 14 in the lateral direction as observed on the paper sheet plane was found to be about 120 nm.

Subsequently, the latent image 9 was subjected to development using a development solution. As shown in FIG. 12, thus was obtained an optical disk master having formed thereon the guide track and the guide groove 11 made of the positive-type photoresist modified layer 14. On observing the thus formed positive-type photoresist modified layer 14 under an electron microscope, the pattern width was found to be about 120 nm.

Thus was obtained an optical disk master equipped with a guide track having track pitch TP approximately the same as that of the optical beam spot diameter BS and a pattern width narrower than the optical beam spot diameter BS.

In the conventional production method described above, the track pitch TP had to be set about twice the beam spot diameter BS to obtain rectangular indentation and protrusion patterns. However, according to the invention, rectangular indentation and protrusion patterns can be implemented even in case the track pitch TP is approximately equal to the beam spot diameter BS.

In the description above, Ta was used for the metallic film 12. However, the metallic film 12 is not only limited to Ta so long as the metallic film 12 and the positive-type photoresist 13 provides an antireflection structure with respect to the laser radiation used for the laser cutting.

Subsequently, on the optical disk master shown in FIG. 12, an Ni electrocasting film 15 was formed by sputtering, and after oxidizing the surface of the Ni electrode film 15 by using oxygen plasma, an Ni electrocasting film 16 was formed by electrocasting to obtain a stamper 17. Thus, a recording medium 19, which comprises a transparent dielectric layer, a recording layer, a transparent dielectric layer, and a reflection layer, was sequentially formed on an optical disk substrate 18 prepared by injection molding, and a protective coating layer made of an ultraviolet curable resin was formed thereon. The recording layer above is made from a material capable of recording information with a convergent irradiated laser radiation by using an optical pick up of an optical disk drive, and usable are an magnetooptical recording material or a phase transformation material. Thus was obtained an optical disk as shown in FIG. 22.

EXAMPLE 1-2

In the present example, the optical disk master (shown in FIG. 12) described in Example 1-1 above was placed inside a dry etching apparatus, and dry etching was applied thereto by using $CF_4$ gas plasma. More specifically, dry etching of Ta metallic film 12 was performed by using the positive-type photoresist modified layer 14 as a mask.

Since anisotropic etching is performed by dry etching, as compared with the guide track pattern formed by the positive-type photoresist modified layer 14, an optical disk master having a Ta metallic film pattern 12 of rectangular shape having an acute pattern edge could be realized. By following the method similar to that described in Example 1-1, an optical disk as shown in FIG. 22 can be produced by sequentially forming a stamper and an optical disk substrate.

Although Ta was used as the metallic film 12 in the present case, there can be used any material capable of dry etching. Hence, materials feasible for dry etching using $CF_4$ plasma include, for instance, Ti and Si. Furthermore, as materials capable of being etched in $CCl_4$ plasma, there can be mentioned Al, Cr, and the like. Furthermore, although it is possible to perform etching by wet etching to the metallic film 12 using a metallic material soluble to an acid or an alkali, wet etching may generate side etching as to destroy the rectangular indentation and protrusion pattern. Hence, it is preferred to form an optical disk master by dry etching.

EXAMPLE 1-3

In Example 1-3, Ni was used as the metallic film 12, and stainless steel was used for the electrode film 15.

On a glass substrate 7, Ni film was formed at a film thickness of 40 nm as a metallic film 12, and S1400 positive-type photoresist produced by Shipley Company, L.L.C., was formed thereon at a film thickness of 50 nm to provide a positive-type photoresist 13.

Subsequently, laser cutting was performed. More specifically, a laser radiation 2 emitted at a wavelength of 351 nm from a Kr laser light source 1 was converged and irradiated to the surface of the positive-type photoresist 13 by using an objective lens 5 having a numerical aperture NA of 0.95. The optical beam spot diameter BS of the converged laser radiation 2 was found to be approximately 300 nm.

Then, laser cutting was performed at a track pitch TP of 300 nm and at a laser power intensity of 4 mW.

Subsequently, the latent image 9 was subjected to development using a development solution. As shown in FIG. 12, thus was obtained an optical disk master having formed thereon the guide track and the guide groove 11 made of the positive-type photoresist modified layer 14.

Then, by using the positive-type photoresist modified layer 14 as a mask, wet etching using nitric acid was performed on the Ni metallic film 12. On removing the positive-type photoresist modified layer 14 above by means of ashing using oxygen plasma, a guide track made of metallic film 12 as shown in FIG. 14 was obtained.

Subsequently, dry etching using $CF_4$ plasma was performed on the glass substrate 7 by using the metallic film 12 above as a mask. In this manner, a groove about 40 nm in depth was formed on the glass substrate 7 as shown in FIG. 15. Finally, the Ni metallic film 12 above was removed by wet etching using nitric acid. In this manner, as shown in FIG. 16, an optical disk master comprising a glass substrate 7 having thereon guide tracks and guide groove 11 with a track pitch TP was obtained.

Subsequently, on the optical disk master shown in FIG. 16, a stainless steel electrode film 15 was formed by sputtering, and after oxidizing the surface of the stainless steel electrode 15 by using oxygen plasma, an Ni electrocasting film 16 was formed by electrocasting to obtain a stamper 17. A recording medium 19, which comprises a transparent dielectric layer, a recording layer, a transparent dielectric layer, and a reflection layer, was sequentially formed on an optical disk substrate 18 prepared by injection molding, and a protective coating layer made of an ultraviolet curable resin was formed thereon. The recording layer above is made from a material capable of recording information with a convergent irradiated laser radiation by using an optical pick up of an optical disk drive, and usable are an magnetooptical recording material or a phase transformation material. Thus was obtained an optical disk as shown in FIG. 22.

EXAMPLE 1-4

The optical disk master produced by the invention as shown in FIG. 16 is different from the optical disk master of a conventional type in that the indentation and protrusion shapes are reversed. Accordingly, the indentation and protrusion shapes also result reversed in the optical disk finally obtained as shown in FIG. 22.

Accordingly, in Example 1-4, description is made on correcting the reversed indentation and protrusion. In the present case, a stamper 17 formed after the stripping off step shown in FIG. 19 is used. Firstly, the surface of the stamper 17 having the guide track thereon is oxidized by oxygen plasma. Thereafter, an Ni electrocasting film 16' is formed on the surface of the formed guide track by using the stamper 17 as the electrode. The plane of the Ni electrocasting film 16' having the indentations and protrusions formed thereon comprises reversed indentations and protrusions as those of the Ni electrocasting film formed in FIG. 19.

Then, by performing polishing on the back plane after stripping off the stamper 17 from the Ni electrocasting film 16', a work stamper 17' is formed with reversed indentations and protrusions with respect to the stamper 17. By forming an optical disk substrate by injection molding using the work stamper 17', an optical disk substrate having indentation and protrusion structure similar to that of a conventional type and yet having prepits and guide grooves (=150 nm) smaller than the optical beam spot diameter (=about 300 nm) can be obtained.

The invention refers to a land recording method or a groove recording method in which the information is recorded in either of the indented portion and the protruded portion of the micropattern, and description has been made specifically on the production of a substrate having a micropattern smaller than the optical beam spot diameter. However, a substrate having micropatterns with narrow width can also be formed in a land-groove recording method, in which information is recorded on both of the indented portion and the protruded portion.

According to the invention, by irradiating a converged optical beam to a substrate having a metallic film and a resin layer formed in this order, a region of modified resin layer rendered insoluble to a development solution is formed to a part of the resin layer at a width smaller than the optical beam spot diameter. In this manner, a substrate having a micropattern comprising prepits and guide grooves smaller than the optical beam diameter can be produced.

Further, by using the substrate having the micropattern, an optical disk master, a stamper for optical disks, and optical disks with a narrower track pitch can be produced.

EXAMPLE 2

Metallic Film and Substrate, Mixed Film

The invention provides a method for forming micropatterns, which comprises forming a metallic film on the surface of a substrate, elevating the temperature of the metallic film to a predetermined temperature or higher by irradiating a converged optical beam to a predetermined position of the metallic film from the upper side of the metallic film, thereby forming a mixed layer consisting of the metallic film and the substrate at the interface between the substrate and the metallic film whose temperature has been elevated, selectively removing the metallic film alone, and etching a region of the substrate having no mixed film formed thereon for a predetermined amount in such a manner that the mixed film and the underlying substrate are left over.

Further, the invention provides a method for forming micropatterns, comprising forming a metallic film on the surface of a substrate, forming a transparent film on the metallic film, elevating the temperature of the metallic film to a predetermined temperature or higher by irradiating a converged optical beam to a predetermined position of the metallic film from the upper side of the transparent film, thereby forming a mixed film consisting of the metallic film and the substrate at the interface between the substrate and the metallic film whose temperature has been elevated, selectively removing the metallic film and the transparent film, and etching a region of the substrate having no mixed film formed thereon for a predetermined amount in such a manner that the mixed film and the underlying substrate are left over.

Further, after etching the region of the substrate having no mixed film formed thereon for the predetermined amount, selectively removing the remaining mixed film by sputter etching. In this manner, the roughness of the substrate surface can be improved.

In the invention, the mixed film is preferably formed in a region smaller than the optical beam spot diameter of the irradiated converged optical beam. Particularly, in case of forming the transparent film, the transparent film is preferably provided in an antireflection structure with respect to the irradiated converged optical beam. An antireflection structure is a structure capable of efficiently absorbing the irradiated converged optical beam. In order to provide a transparent film exhibiting an antireflection effect, the film thickness of the transparent film should be selected in relation with the wavelength of the optical beam.

Any material that is transparent may be used as the material for the transparent film, and there can be used, for instance, a transparent resin, a transparent dielectric film, and the like; for instance, there can be used AlN. As the substrate, there can be used materials such as glass, Si, or $SiO_2$, but other materials such as plastics and compound semiconductors may be used as well. The material for use as the metallic film may be a metal such as Al, Co, or Pd, but also usable are other metals with lower melting points.

Furthermore, by further performing Ni electrocasting on the optical disk master above, an optical disk stamper can be produced by a so-called transfer process. Further, an optical disk can be produced by using the optical disk stamper above and by carrying out injection molding of a resin and the formation of a recording medium and the like.

In order to efficiently form a mixed film in a region smaller than the optical beam spot diameter by irradiating an optical beam, it is preferred to use, in addition to the transparent film having the antireflection structure, a metallic film having the antireflection structure.

In order to use a transparent film and the like having an antireflection structure, that is, in order to achieve an antireflection effect, the film thickness of the transparent film and the like must be set properly in relation with the wavelength of the optical beam. For instance, the film thickness w of the transparent film is set to $w=(m\lambda)/(4n)$, where m is an odd number, $\lambda$ represents the wavelength of the laser radiation, and n represents the refractive index of the transparent film.

The predetermined temperature for forming the mixed film (which is referred to hereinafter as "mixing film forming temperature") signifies a temperature at which a solid solution, an eutectic compound, or a intermetallic compound is formed through the reaction of the metallic film and the substrate, and at which an alloy of both materials is formed at the interface between the metallic film and the substrate.

For instance, in case Si is used as the substrate material and Al is used as the metallic film, the mixing film forming temperature is ca. 500° C. or higher, and a mixed film comprising Al mixed into Si is formed at the boundary region brought to a temperature of about 500° C. or higher.

The present invention is described in detail based on the embodiment with reference to the attached drawings. It should be understood, however, that the invention is not limited thereby.

A conventional laser cutting apparatus as shown in FIG. 1 is also usable as the laser cutting apparatus for use in the production of an optical disk master according to the invention. Conventionally used was a glass substrate 7 having directly formed thereon a positive-type photoresist 6 as shown in FIG. 1. In the invention, however, used is a glass substrate having formed thereon a metallic film.

In order to realize an optical disk master having a narrower track pitch according to the invention, an optical disk master having micropatterns is produced by a method as follows.

The example below refers to an optical disk of a land recording method or a groove recording method, in which the micropatterns formed on the surface of the substrate comprise a pair of an indented portion and a protruded portion to constitute a single track, and in which the information is recorded in either of the indented portion or the protruded portion. According to this method, the length corresponding to the sum of the width of a pair of indented portion and protruded portion is the track pitch TP.

Figure 23:
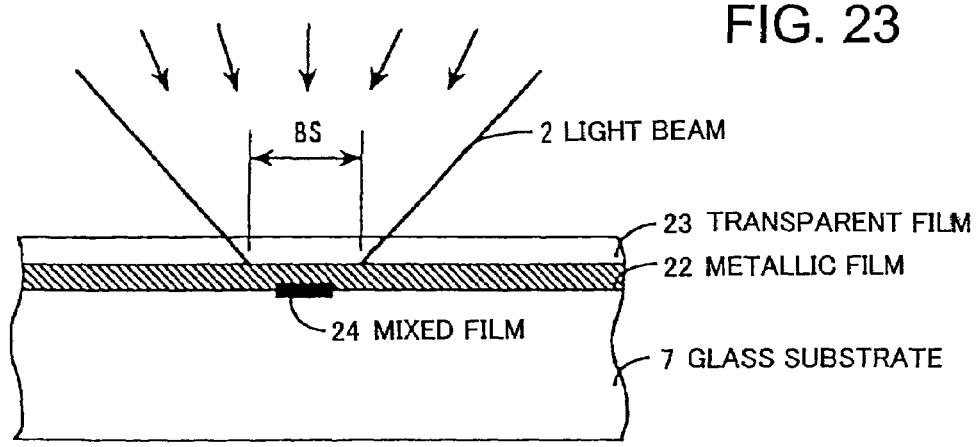
FIG. 23 is cross section view provided to explain an exposure process of an embodiment of a method for producing an optical disk master according to the invention.

In FIG. 23 is given a schematically drawn explanatory diagram for laser cutting according to the production method for an optical disk master of the invention.

As the optical disk master, there is used a substrate 7 made of glass (quartz), silicon, and the like, having formed thereon in this order, a metallic film 22 (made of, e.g., aluminum) and a transparent film 23 (e.g., of aluminum nitride: AlN). Firstly, an optical beam having a predetermined beam spot diameter BS is irradiated from the upper side of the transparent film 23 provided to the master, to thereby form a mixed film 24. Thus, as shown in FIG. 23, the mixed film 24 is formed only at a limited region in the interface between the metallic film 22 and the substrate 7, in which the temperature of the metallic film 22 is elevated to a mixed film forming temperature or higher.

In case the mixed film is formed from the aluminum metallic film 22 and the silicon substrate 7, the mixed film forming temperature is, for instance, about 500° C. Furthermore, the film thickness of the transparent film 23 is preferably set as such that it exhibits an antireflective effect, such that the laser radiation 2 used for exposure would be incident to the metallic film 22. For instance, the film thickness w of a preferred transparent film 23 can be expressed by $w=(m\lambda)/(4n)$, where $\lambda$ represents the wavelength of the laser radiation 2, n represents the refractive index of the transparent film 23, and m is an odd number.

By thus providing a transparent film 23 with an antireflection structure formed on the metallic film 22, the optical beam 2 is absorbed by the metallic film 22 and the transparent film 23.

In case the optical beam 2 is absorbed by the metallic film 22, a Gaussian temperature distribution corresponding to the intensity distribution of the optical beam 2 results effectively in the metallic film 22.

Figure 24:
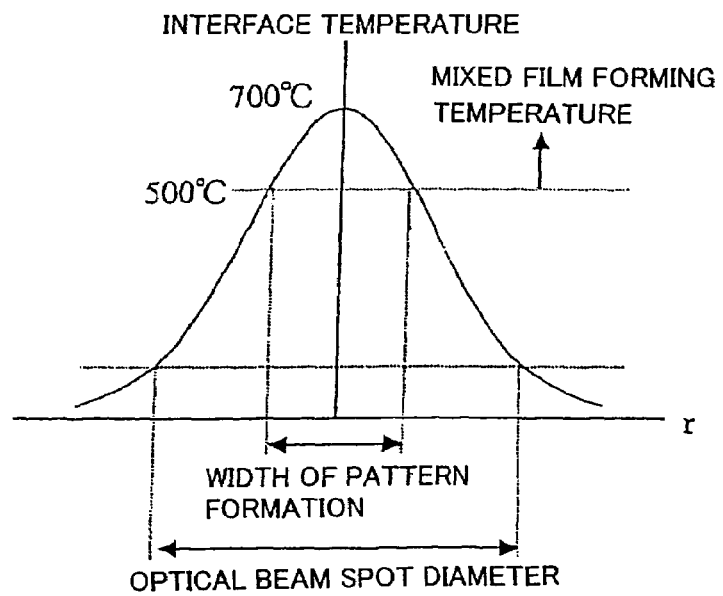
FIG. 24 is an explanatory drawing of a temperature distribution at the boundary with respect to an optical beam spot diameter according to the invention.

In FIG. 24 is shown an example of a temperature distribution with respect to the spot diameter of the optical beam irradiated to the metallic film 22.

In the temperature distribution shown in FIG. 24, the optical beam spot diameter is set to 300 nm. In this case, the temperature distribution yields a peak of 700° C. at the boundary of the metallic film 22, the width of the mixed film 24 is about 100 nm, and the mixed film 24 is formed at a temperature of 500° C. or higher.

According to the distribution above, it can be understood that the mixed film 24 comprising the materials of the metallic film 22 and the substrate 7 is formed within a region smaller in width than the beam spot diameter BS of the optical beam 2, which is elevated in temperature to a level (500° C.) necessary for the formation of a mixed film or higher. Furthermore, the formation of a mixed film having a width smaller than the beam spot diameter BS was confirmed by detecting fluorescent X ray emitted from the converged electron beam as observed under scanning electron microscope.

In FIG. 23, the mixed film 24 is shown between the metallic film 22 and the substrate 7 by a rectangle having a constant width in the vertical direction as observed on the paper sheet plane. In practice, the mixed film 24 is formed as a thin film at the interface between the metallic film 22 and the substrate 7.

Figure 25:
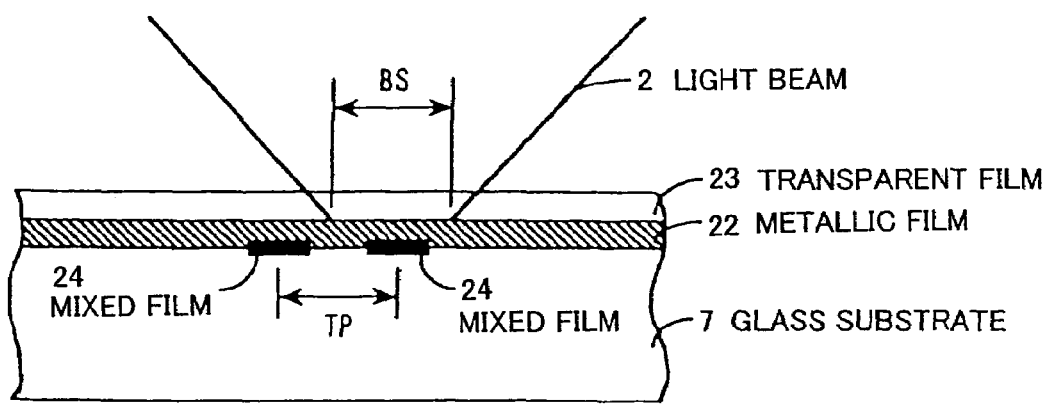
FIG. 25 is a cross section view provided to explain an exposure process of an embodiment of a method for producing an optical disk master according to the invention.

In FIG. 25 is shown a cross section shape in case exposure is performed to the neighboring track with a track pitch TP almost equivalent to that of the optical beam spot diameter BS. Since the region of the metallic film 22 with its temperature elevated to the mixed film forming temperature or higher is smaller than the optical beam spot diameter BS in this case, the mixed film 24 is formed separated in the direction of the track.

Figure 26:
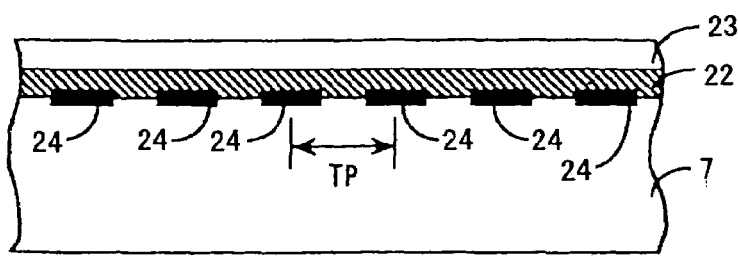
FIG. 26 is a cross section view provided to explain an exposure process of an embodiment of a method for producing an optical disk master according to the invention.

FIG. 26 shows a cross section shape in case the laser cutting above is performed continuously to implement a spiral-like laser cutting. In the interface between the metallic film 22 and the substrate 7, the mixed films 24 are aligned separated from each other at a track pitch TP. The continuous cutting is carried out by gradually moving the down edge mirror 3-3 and the objective lens 5 shown in FIG. 1.

Since mixed films 24 (about 150 nm in width each) having a width smaller than the track pitch TP (e.g., 300 nm) are formed separated from each other at a track pitch TP, the guide groove 11 corresponding to the indentations between the mixed films can be formed at a width narrower than the track pitch.

After performing laser cutting as described above, the transparent film 23 and the metallic film 22 are removed by wet etching or dry etching to leave the mixed film 24 alone on the substrate 7.

Figure 27:
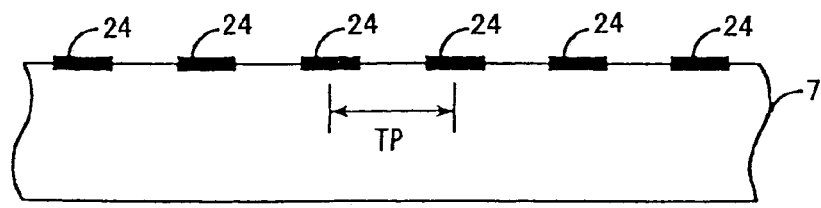
FIG. 27 is a cross section view provided to explain a state after a metallic film and a transparent film are removed in accordance with the invention.

In FIG. 27 is shown the cross section of a state in which the transparent film 23 and the metallic film 22 are removed by etching and the mixed film 24 alone is left over. Wet etching can be carried out by, for instance, using an aqueous acid solution or an aqueous alkaline solution. Dry etching can be performed by using gaseous $CF_4$ or gaseous $CCl_4$.

Subsequently, the exposed portion of the substrate 7 having no mixed film 24 formed thereon is etched by using the mixed film 24 as a mask. The etching can be performed by using wet etching or dry etching.

Figure 28:
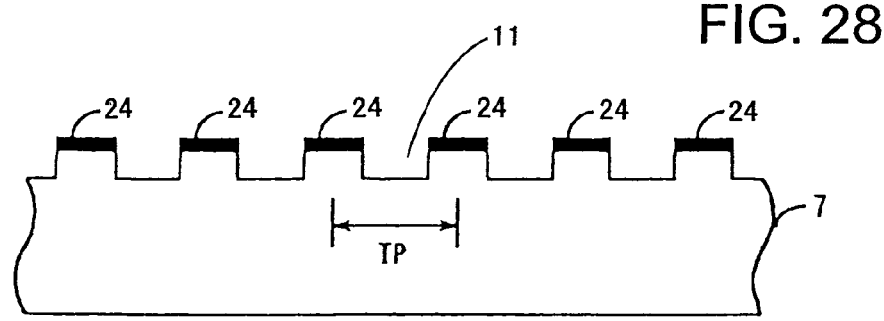
FIG. 28 is a cross section view provided to explain a state in which a surface of a substrate region having no mixed film formed thereon is etched in accordance with the invention.

FIG. 28 shows a cross section shape obtained after etching the substrate 7. Referring to FIG. 28, a protruded portion 150 nm in width of the mixed film 24 and the guide groove 11 provided as the indented portion 150 nm in width both possess rectangular shapes, and are formed at a track pitch TP of about 300 nm.

It is possible to use the optical disk master directly in the state shown in FIG. 28, however, from the viewpoint of improving the surface roughness, it is preferred to apply etching to the surface of the mixed film 24 and the substrate 7.

Figure 29:
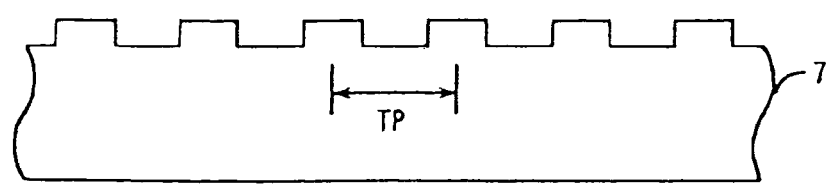
FIG. 29 shows a finished optical disk master produced according to a production process of the invention.

More specifically, by etching the substrate 7 and the mixed film 24 for a predetermined amount by means of sputter etching as shown in FIG. 29, an optical disk master having improved surface roughness can be completed.

The optical disk master thus completed comprises rectangular protruded portions as the guide track, and since the pitch thereof is formed at a narrow track pitch TP nearly equal to the optical beam spot BS, an optical disk suitable for high density recording and having improved stability in tracking performance can be implemented by using the optical disk master thus obtained.

The process for producing an optical disk from the optical disk masters finished by the production processes above is described below.

Figure 33:
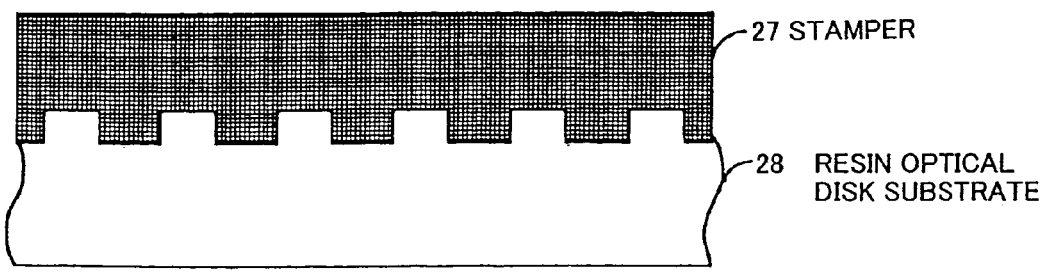
FIG. 33 is a cross section view provided to explain a state in which a resin optical disk substrate is produced from a stamper according to the invention.
Figure 34:
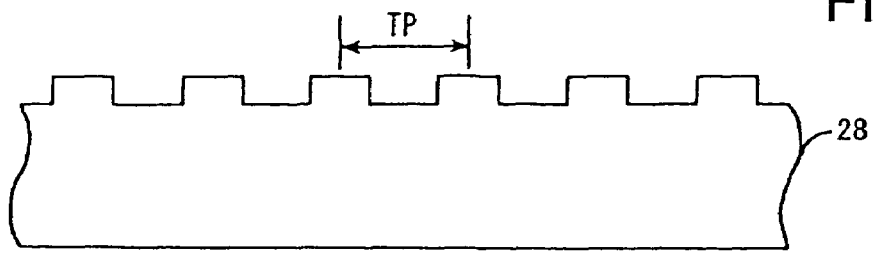
FIG. 34 shows a finished optical disk substrate produced according to the invention.
Figure 35:
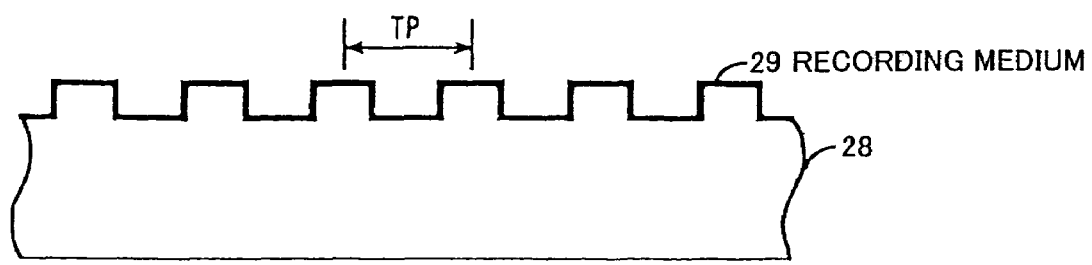
FIG. 35 is a cross section view provided to explain a state in which a recording medium is formed on an optical disk substrate according to the invention.

In the following, the cross section states of the disk are shown. More specifically, FIG. 30 shows the process step for forming an electrode film, FIG. 31 shows a step for forming an Ni electrocasting, FIG. 32 shows a step for forming a stamper by stripping off, FIG. 33 shows a step for molding a resin optical disk substrate, FIG. 34 shows a step for finishing the optical disk substrate, and FIG. 35 shows a step for forming a recording medium.

Figure 30:
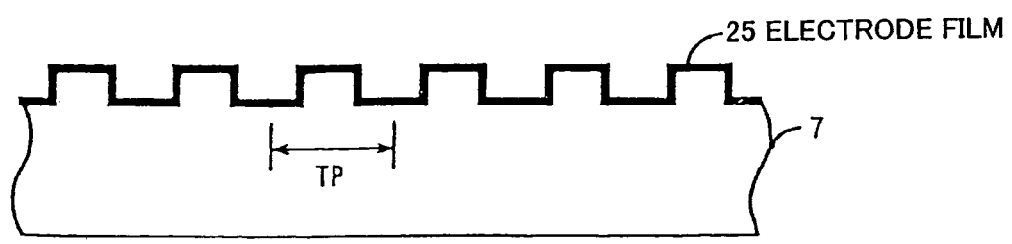
FIG. 30 is a cross section view provided to explain a state in which an electrode film is formed on an optical disk master according to the invention.

Firstly, as shown in FIG. 30, an electrode film 25 to provide an electrode for electrocasting is formed on the surface of the optical disk master by means of sputtering and the like. As the electrode film material, preferred is to use a metal such as Ni, Ta, stainless steel, and the like. Further, to facilitate the stripping off of the stamper from the electrode film 25 in the later step of stripping off the stamper, the surface of the electrode film is subjected to oxidation treatment by means of ashing and the like.

Figure 31:
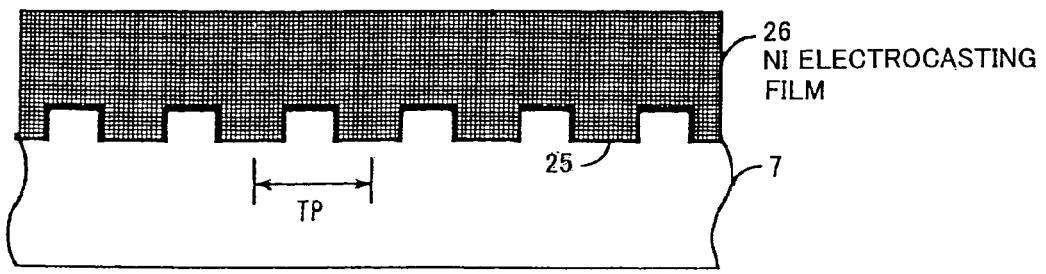
FIG. 31 is a cross section view provided to explain a state in which an Ni electrocasting film is formed on an optical disk master according to the invention.

Then, as shown in FIG. 31, an Ni electrocasting film 26 is formed by carrying out electrocasting of Ni using the electrode film 25 as the electrode.

Figure 32:
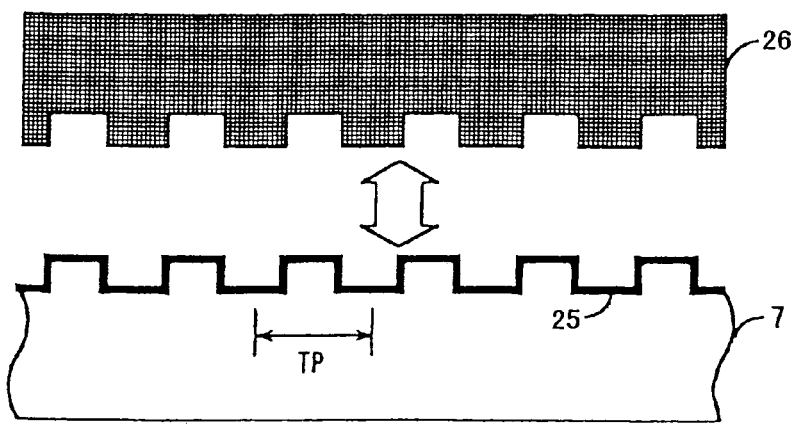
FIG. 32 is a cross section view provided to explain a state in which an Ni electrocasting film is stripped off from an optical disk master according to the invention.

Subsequently, as shown in FIG. 32, after stripping off the Ni electrocasting film from the electrode film 25, the back plane (the side having the indentations and protrusions as shown in FIG. 32) of the Ni electrocasting film 26 is subjected to polish treatment. The Ni electrocasting film 26 thus subjected to polish treatment provides a stamper 27.

As shown in FIG. 33, the stamper 27 is attached to an injection molding machine, and by injection molding a resin such as polycarbonate, a resin optical disk substrate 28 can be obtained as shown in FIG. 34.

Finally, as shown in FIG. 35, a recording medium 29 is formed on the plane of the optical disk substrate 28 having formed thereon the guide track (i.e., the surface of the substrate having the indentations and protrusions) to obtain a finished optical disk.

The recording medium 29 referred herein is a so-called structured layer consisting of plural layers for recording data; for instance, it may comprise a transparent dielectric layer, a recording layer, a transparent dielectric layer, and a reflection layer laminated in this order.

Thus, the optical disk produced in this manner comprises a rectangular guide track (the protruded portion formed on the surface of the disk shown in FIG. 35) formed at a track pitch TP (e.g., 300 nm) nearly equal to the optical beam spot diameter BS used for the laser cutting. Since a rectangular guide track is formed, an optical disk suitable for high density recording and having a narrower track pitch and improved stability in tracking performance can be implemented with high precision by using the optical disk master produced in this manner.

Examples of the optical disk masters and the methods for producing optical disk masters and the like according to the invention are described below.

EXAMPLE 2-1

On a Si substrate 7, Al film was formed at a film thickness of 40 nm as a metallic film 22, and AlN was formed thereon at a film thickness of 44 nm to provide a transparent film 23. These films can be formed by reactive sputtering process.

Subsequently, laser cutting was performed. More specifically, a laser radiation 2 emitted at a wavelength of 351 nm from a Kr laser light source 1 was converged and irradiated to the surface of the transparent film 23 by using an objective lens 5 having a numerical aperture NA of 0.95. The optical beam spot diameter BS of the converged laser radiation 2 was found to be approximately 300 nm, and the track pitch TP was set to 300 nm to perform the laser cutting at a laser power intensity of 20 mW. The metallic film 22 having the film thickness above and the transparent film 23 provide an antireflective structure with respect to a laser radiation 351 nm in wavelength. Thus was obtained a mixed film 24 having a structure as shown in FIG. 26 in this process step.

Then, by wet etching using a sodium hydroxide solution, the AlN transparent film 23 and the Al metallic film 22 were removed. In this manner, a mixed film 24 made of Al and Si were left over as shown in FIG. 27. Further, on observing the thus formed mixed film 24 with fluorescent X ray of the electron microscope, the pattern width of the remaining mixed film 24 was found to be 120 nm. More specifically, a mixed film 24 having the track pitch TP (300 nm) equal to that of the optical beam spot diameter BS and a narrower pattern width than the optical beam spot diameter BS was formed.

Subsequently, by using the mixed film 24 as a mask, dry etching of Si substrate 7 was performed. Thus, the Si substrate 7 was placed inside a dry etching apparatus, a mixed gas of $CF_4$ etching gas (at a flow rate of 50 sccm) and $O_2$ (at a flow rate of 30 sccm) was introduced inside the apparatus, and the gas pressure on dry etching was set to 30 mTorr, at which radio frequency power of 400 W was applied.

Since the mixed film pattern 24 comprised a mixture of Si and Al, etching of the mixed film hardly proceeded but the Si substrate 7 alone was etched under the dry etching conditions above (see FIG. 28). For instance, in case dry etching is performed for a duration of 1 minute, the region of the Si substrate 7 having no mixed film 24 formed thereon was etched for a depth of about 400 nm to obtain a rectangular indented portion. The width of the indented portion, i.e., the width in the lateral direction as observed on the paper sheet plane of the guide groove 11, was found to be about 150 nm. That is, a guide groove 11 having a width smaller than the optical beam spot diameter was obtained.

In the conventional production method described above, the track pitch TP had to be set about twice the beam spot diameter BS to obtain rectangular indentation and protrusion patterns. However, according to the invention, rectangular indentation and protrusion patterns can be implemented even in case the track pitch TP is approximately equal to the beam spot diameter BS.

Subsequently, gaseous Ar was introduced into the etching apparatus above at a flow rate of 70 sccm, the gas pressure was set to 10 mTorr, and a high frequency power of 500 W was applied to remove the mixed film 24 by sputter etching.

In this manner, the surface roughness was improved, and the optical disk master as shown in FIG. 29 was completed.

Then, as shown in FIG. 30, a Ni electrode film 25 was formed on the optical disk master above by sputtering. Then, after oxidizing the surface of the Ni electrode film 25 by using oxygen plasma, an Ni electrocasting film 26 was formed by electrocasting (see FIG. 31). The Ni electrocasting film 26 was stripped off from the optical disk master, and the back plane of the Ni electrocasting film 26 was subjected to polish treatment to obtain a stamper 27 (FIG. 32).

Then, polycarbonate was injection molded to the indented and protruded plane of the stamper 27, and by stripping off from the stamper 27, a resin optical disk substrate 28 was obtained (see FIGS. 33 and 34).

Furthermore, after forming a recording medium 29 comprising a transparent dielectric layer, a recording layer, a transparent dielectric layer, and a reflection layer laminated in this order on the optical disk substrate 28, a protective coating layer made of an ultraviolet curable resin was formed as the upper layer thereof. The recording layer above is made from a material capable of recording information with a convergent irradiated laser radiation by using an optical pick up of an optical disk drive, and usable are an magnetooptical recording material or a phase transformation material.

Thus was obtained an optical disk as shown in FIG. 35.

In Example 2-1, the optical disk obtained by removing the mixed film 24 by sputter etching was used as the master, but the optical disk master with the mixed film 24 still remaining thereon can be used as the optical disk master.

However, in order to reduce the noise of the optical disk, it is preferred to perform sputter etching as described above. On measuring the surface roughness at each state by using an atomic force microscope, the surface roughness of the etching plane of the Si substrate 7 in case of not performing sputter etching was found to be 0.29 nm, and in contrast to the surface roughness of 0.88 nm for the mixed film 24, the etched plane of the Si substrate 7 was found to be reduced to 0.23 nm by performing sputter etching; the surface roughness of the Si substrate 7 obtained after removing the mixed film 24 was found to be 0.27 nm. That is, the surface roughness of the optical disk master can be reduced by performing sputter etching, and thereby an optical disk with reduced noise can be realized.

EXAMPLE 2-2

An Si substrate was used as the substrate 7 in the process for producing the optical disk master of Example 2-1, but it is possible to use a substrate other than Si substrate.

Accordingly, a case of using a quartz substrate as the substrate 7 is described in the example below.

Firstly, in a manner similar to that described in Example 2-1, an Al metallic film 22 and an AlN transparent film 23 were formed, and a mixed film 24 of Al and $SiO_2$ was formed by laser cutting. Thereafter, the AlN transparent film 23 and the Al metallic film 22 were sequentially removed, and dry etching was performed by using the mixed film 24 of Al and $SiO_2$ as a mask. Dry etching was carried out by introducing $CF_4$ etching gas (at a flow rate of 100 sccm) at a gas pressure of 30 mTorr, and by applying a high frequency power of 400 W.

Under the etching conditions above, etching of the mixed film hardly proceeded but the $SiO_2$ substrate 7 alone was etched, because the mixed film 24 comprised Al mixed in $SiO_2$. Finally, an optical disk master having indentations and protrusions similar to those obtained in Example 2-1 was implemented by performing sputter etching.

EXAMPLE 2-3

In the method for producing the optical disk master described in Example 2-1, Al was used as the metallic film 22, but a metal other than Al, for instance, Co, can be used as well.

In case of using Co as the metallic film 22 shown in FIG. 23, a mixed film 24 made of Co and $SiO_2$ is formed.

The AlN transparent film 23 was removed by wet etching using a sodium hydroxide solution, and after removing the sodium hydroxide solution by rinsing with pure water, the Co metallic film 22 was removed by using an aqueous (3HCl/$H_2O$) solution. In this manner, a mixed film 24 of Co and $SiO_2$ was left over as shown in FIG. 27.

Then, the quartz substrate 7 was placed inside a dry etching apparatus, and by using the mixed film 24 as a mask, dry etching of the quartz substrate 7 was carried out by introducing $CF_4$ etching gas at a flow rate of 100 sccm at a gas pressure of 30 mTorr, and by applying a high frequency power of 400 W.

Under the etching conditions above, etching of the mixed film hardly proceeded but the quartz substrate 7 alone was etched, because the mixed film 24 comprised Co mixed in $SiO_2$. Then, an optical disk master can be completed by performing sputter etching in a manner similar to that described in Example 2-1. As the metallic film 22, there can be used a 3d transition metal of Fe or Ni similar to Co.

EXAMPLE 2-4

In the present example, description is made on a case using Pd as the metallic film 22. In this case, a mixed film 24 of Pd and $SiO_2$ is formed by irradiating an optical beam from the upper side of the transparent film 23 as shown in FIG. 23.

The AlN transparent film 23 was removed by wet etching using a sodium hydroxide solution, and after removing the sodium hydroxide solution by rinsing with pure water, the Pd metallic film 22 was removed by using an aqueous (KI/$I_2$) solution. In this manner, a mixed film 24 of Pd and $SiO_2$ was left over as shown in FIG. 27.

Then, the quartz substrate 7 was placed inside a dry etching apparatus, and by using the mixed film 24 as a mask, dry etching of the quartz substrate 7 was carried out by introducing $CF_4$ etching gas at a flow rate of 100 sccm at a gas pressure of 30 mTorr, and by applying a high frequency power of 400 W. Under the etching conditions above, etching of the mixed film hardly proceeded but the quartz substrate 7 alone was etched, because the mixed film 24 comprised Pd mixed in $SiO_2$. Then, an optical disk master can be completed by performing sputter etching in a manner similar to that described in Example 2-1.

EXAMPLE 2-5

The optical disk master shown in FIG. 29 produced in accordance with the invention differs from a conventional optical disk master in that the indentations and protrusions are reversed. Accordingly, the indentation and protrusion shapes also result reversed in the optical disk finally obtained as shown in FIG. 35. Thus, in Example 2-5, description is made on correcting the reversed indentation and protrusion.

In the present case, a stamper 27 formed after the stripping off step shown in FIG. 32 is used.

Firstly, the surface of the stamper 27 having the guide track thereon is oxidized by oxygen plasma. Thereafter, an Ni electrocasting film 26' is formed on the surface of the formed guide track by using the stamper 27 as the electrode. The plane of the Ni electrocasting film 26' having the indentations and protrusions formed thereon comprises reversed indentations and protrusions of the Ni electrocasting film 26 formed in FIG. 32.

Then, by performing polishing on the back plane after stripping off the stamper 27 from the Ni electrocasting film 26', a work stamper 27' is formed with reversed indentations and protrusions with respect to the stamper 27.

By forming an optical disk substrate using the work stamper 27', an optical disk substrate having indentation and protrusion structure similar to that of a conventional type and yet having prepits and guide grooves (=150 nm) smaller than the optical beam spot diameter (=about 300 nm) can be obtained.

The invention refers to a land recording method or a groove recording method in which the information is recorded in either of the indented portion and the protruded portion of the micropattern, and description has been made specifically on the production of a substrate having a micropattern smaller than the optical beam spot diameter. However, a substrate having micropatterns with narrow width can also be formed in a land-groove recording method, in which information is recorded on both of the indented portion and the protruded portion.

According to the invention, by irradiating a converged optical beam to a substrate having a metallic film formed thereon, a mixed film having a diameter smaller than the optical beam spot diameter is formed at the interface between the metallic film and the substrate. In this manner, a substrate having a micropattern comprising prepits and guide grooves smaller than the optical beam diameter can be produced.

Further, by using the substrate having the micropattern, an optical disk master, a stamper for optical disks, and optical disks with a narrower track pitch can be produced.

EXAMPLE 3

Mask Layer and Metallic Film, Mixed Layer

The invention provides a method for forming micropatterns, comprising forming a mask layer on a substrate, forming a metallic film on the surface of the mask layer, elevating the temperature of the metallic film to a predetermined temperature or higher by irradiating a converged optical beam to a predetermined position of the metallic film from the upper side of the metallic film, forming a mixed layer consisting of the metallic film and the mask layer at the interface between the metallic film and the mask layer whose temperature has been elevated, selectively removing the metallic film, and selectively etching a region of the mask layer having no mixed layer formed thereon in such a manner that the mixed layer is left over.

On etching the mask layer, or after etching the mask layer, the substrate may be selectively etched.

Furthermore, after forming the metallic layer, a transparent film may be formed on the metallic film before irradiating a converged optical beam.

The mixed layer is preferably formed in a region smaller than the spot diameter of the convergent irradiated optical beam, and particularly, the metallic film and the transparent film preferably provide an antireflection structure with respect to the convergent irradiated optical beam. A substrate having micropatterns formed in this manner can be used as an optical disk master and the like.

Furthermore, the mixed layer thus left over may be removed by sputter etching, and in such a case, a substrate having a smoother surface can be formed.

Then, by using the optical disk master having the micropatterns as above, an optical disk stamper can be produced by performing so-called transfer process.

Further, an optical disk can be produced by using the optical disk stamper above and by carrying out injection molding of a resin and the formation of a recording medium and the like.

Furthermore, an optical disk work stamper having reversed surface indentations and protrusions can be produced by forming an electrocasting film using the optical disk stamper as an electrode and by then stripping off the electrocasting film from the optical disk stamper, and an optical disk can be produced by using the resulting work stamper for optical disks.

As the mask layer above, there can be used Si, SiN, or $SiO_2$, and Al, Co, Fe, Ni, Pd, or Ti can be used for the metallic film, but the invention is not limited thereto. As the substrate, there may be used those made of glass, silicon, plastics, and the like. Furthermore, AlN can be used for the transparent film.

A conventional laser cutting apparatus as shown in FIG. 1 is also usable as the laser cutting apparatus for use in the production of an optical disk master according to the invention.

Conventionally used was a glass substrate having directly formed thereon a positive-type photoresist 6. In the invention, however, used is a glass substrate 7 having a mask layer 32, a metallic film 33, and a transparent film 34, formed in this order.

According to the invention, an optical disk master having micropatterns is produced by a method as follows.

The example below refers to an optical disk of a land recording method or a groove recording method, in which the micropatterns formed on the surface of the substrate comprise a pair of an indented portion and a protruded portion to constitute a single track, and in which the information is recorded in either of the indented portion or the protruded portion. According to this method, the length corresponding to the sum of the width of a pair of indented portion and protruded portion is the track pitch TP.

Figure 36:
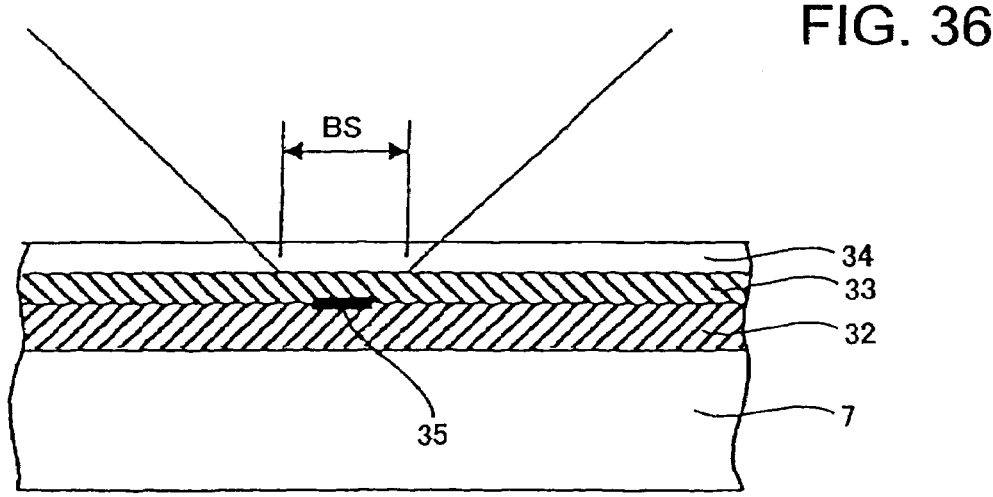
FIG. 36 is cross section view provided to explain an exposure process of an embodiment of a method for producing an optical disk master according to the invention.

In FIG. 36 is given a schematically drawn explanatory diagram for laser cutting according to the production method for an optical disk master of the invention.

As the optical disk master, there is used a substrate 7 made of glass (quartz) or silicon and the like, having formed thereon a mask layer 32 made of, e.g., $SiO_2$, at a thickness of about 40 nm by means of sputtering.

Subsequently, a metallic film 33 made of, for instance, Al, is formed on the mask layer 32 by means of sputtering at a thickness of about 400 nm. Further on the metallic film 33, a transparent film 34 made of, for example, AlN, is formed at a thickness of about 44 nm.

The transparent film 34 is preferably formed on the metallic film 33 in order to prevent the reflection or to control the laser power sensitivity of the irradiated laser radiation; however, it is not essential, and a mixed layer 35 described below may be formed without forming the transparent film.

The film thickness of the transparent film 34 must be set in such a manner that it exhibits an antireflective effect with respect to the laser radiation 2 used for the exposure. For instance, a preferred film thickness w of the transparent film 34 is set to $w=(m\lambda)/(4n)$, where m is an odd number, $\lambda$ represents the wavelength of the laser radiation 2, and n represents the refractive index of the transparent film. There can be used AlN for the transparent film 34.

Figure 37:
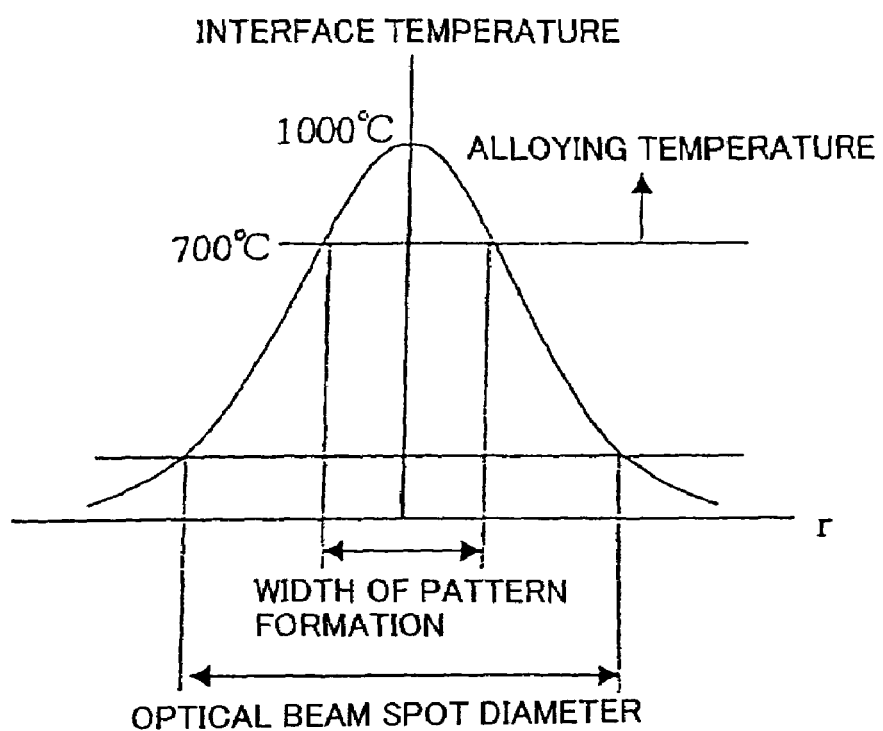
FIG. 37 is an explanatory drawing of a temperature distribution at the boundary with respect to an optical beam spot diameter according to the invention.

By thus providing a transparent film 34 having an antireflection structure formed on the metallic film 33, the optical beam 2 is absorbed by the mask layer 32, the metallic film 33, and the transparent film 34. In case the optical beam is absorbed by the metallic film 33, a Gaussian temperature distribution corresponding to the intensity distribution of the optical beam 2 results in the metallic film 33. In FIG. 37 is shown an example of a temperature distribution with respect to the spot diameter of the optical beam irradiated to the metallic film 33.

By irradiating an optical beam 2 to the metallic film 33, a mixed layer 35 comprising mixed therein the metallic film 33 and the mask layer 32 is formed at the interface between the mask layer 32 and the metallic film 33 elevated in temperature to a predetermined value or higher. The formation of the mixed layer 35 can be confirmed by means of electron microscope.

The temperature distribution shown in FIG. 37 shows a temperature distribution in case the optical beam spot diameter BS is set to 300 nm. In this case, the temperature distribution yields a peak of about 1000° C. in the metallic film 33, and the width of the region having its temperature elevated to 700° C. or higher, i.e., the width of the mixed layer 35, is smaller than the optical beam spot diameter, and is about 120 nm.

In this case, the critical temperature for forming the mixed layer 35 (which is 700° C. in FIG. 37) is referred to hereinafter as the mixed layer forming temperature or the alloydizing temperature.

By using the mixed layer 35 thus formed as the mask, the portions of the mask layer 32 and the metallic film 33 other than the mixed layer 35 are removed by etching in the later process step.

Figure 38:
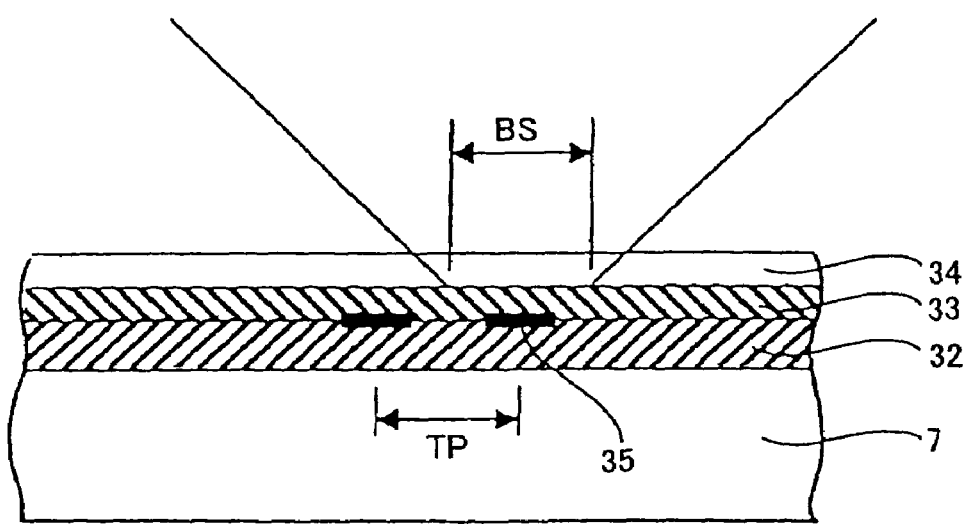
FIG. 38 is a cross section view provided to explain an exposure process of an embodiment of a method for producing an optical disk master according to the invention.

In FIG. 38 is shown a cross section shape in case exposure is performed to the neighboring track having a width of track pitch TP (=300 nm) almost equivalent to that of the optical beam spot diameter BS. Since the width of the region (=150 nm) having its temperature elevated to the mixed layer forming temperature or higher is smaller than the optical beam spot diameter BS (=300 nm) in this case, the mixed layer 35 is formed separated in the direction of the track.

Figure 39:
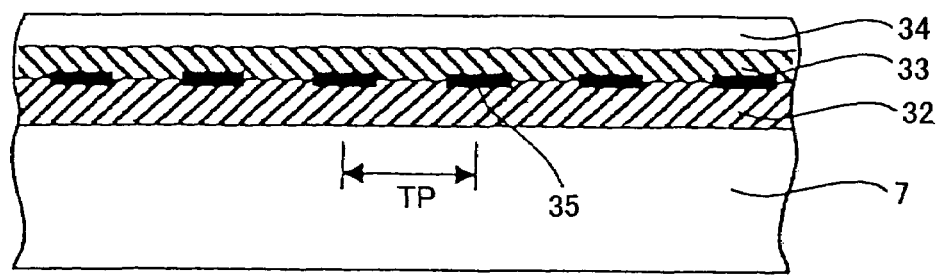
FIG. 39 is a cross section view provided to explain an exposure process of an embodiment of a method for producing an optical disk master according to the invention.

FIG. 39 shows a cross section shape in case the laser cutting above is performed continuously to implement a spiral-like laser cutting. Referring to FIG. 39, the mixed layers 35 are aligned separated from each other at a track pitch TP in the interface between the metallic film 33 and the mask layer 32. The continuous cutting is carried out by gradually moving the down edge mirror 3-3 and the objective lens 5 shown in FIG. 1.

Figure 40:
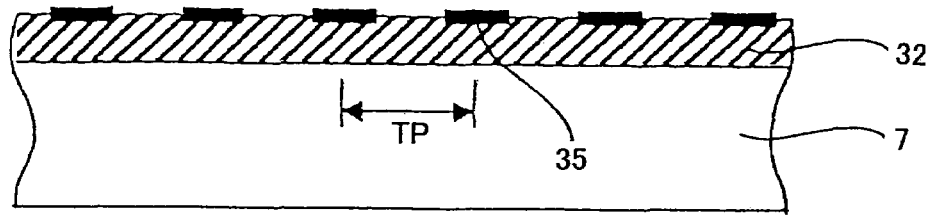
FIG. 40 is a cross section view provided to explain a state after a transparent film and a metallic film are removed in accordance with the invention.

In FIG. 40 is shown the cross section of a state in which the transparent film 34 and the metallic film 33 are removed by etching after applying the laser cutting above.

Etching can be carried out by wet etching or dry etching, and is performed by using a wet etching solution or a dry etching gas capable of etching the transparent film 34 and the metallic film 33, while leaving over the mixed layer 35 and the mask layer 32. The solution for use in wet etching or the dry etching gas used herein depends on the material used in the metallic film 33 and the like.

Then, by using the mixed layer 35 as a mask, the mask layer 32 having no mixed layer 35 thereon is etched.

Figure 41:
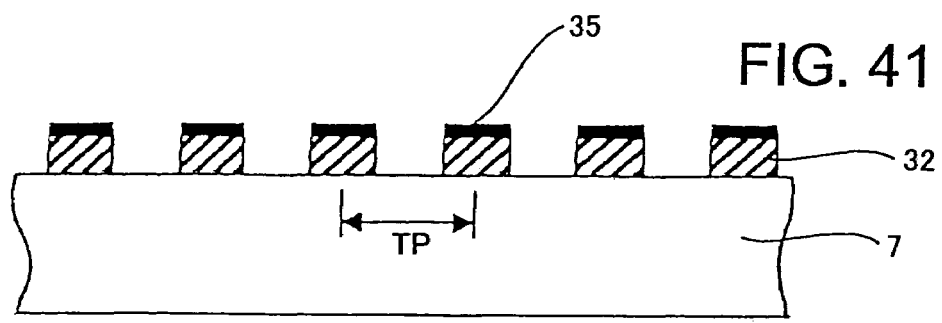
FIG. 41 is a cross section view provided to explain a state in which a mask layer region having no mixed layer formed thereon is etched in accordance with the invention.

In FIG. 41 is shown the cross section shape obtained after removing the region of the mask layer 32 having no mixed layer 35 thereon.

In order to remove the mask layer 32 while leaving over the mixed layer 35, there can be used wet etching or dry etching. The wet etching solution or the dry etching gas used herein depends on the material used in the mask layer 32.

Referring to FIG. 41, a substrate 7 with a structure having thereon the mixed layers 35 arranged at a track pitch TP of about 300 nm is formed. The substrate with the structure as shown in FIG. 41 can be used as an optical disk master.

Subsequently, with the state shown in FIG. 41, the substrate 7 is etched to a depth of about 40 nm by using the mixed layer 35 as a mask. The etching can be performed by wet etching or dry etching.

Figure 42:
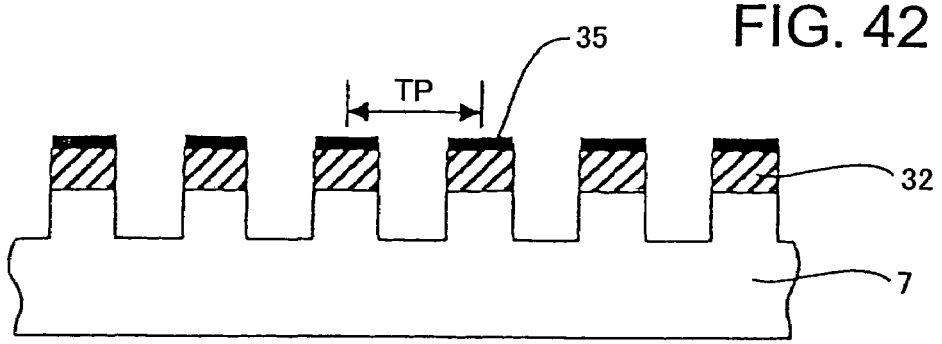
FIG. 42 is a cross section view provided to explain a state in which a substrate surface region having no mixed layer formed thereon is etched in accordance with the invention.

The substrate in the state as shown in FIG. 42 can also be used as an optical disk master.

Figure 43:
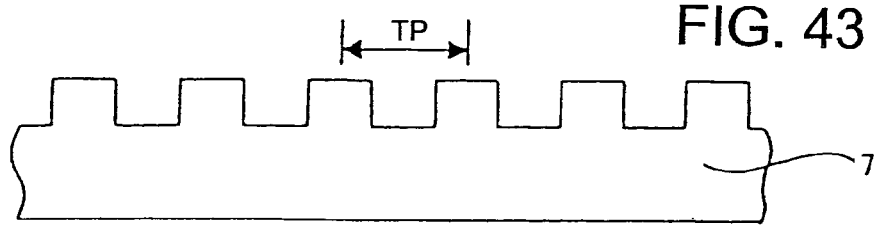
FIG. 43 shows a finished optical disk master produced according to a production process of the invention.

Furthermore, by etching the mask layer 32 and the mixed layer 35 by means of dry etching, a substrate 7 having indentations and protrusions on the surface as shown in FIG. 43 is formed.

In the state shown in FIG. 41, the substrate 7 and the mixed layer 35 may be subjected to sputter etching instead of dry etching.

Figure 50:
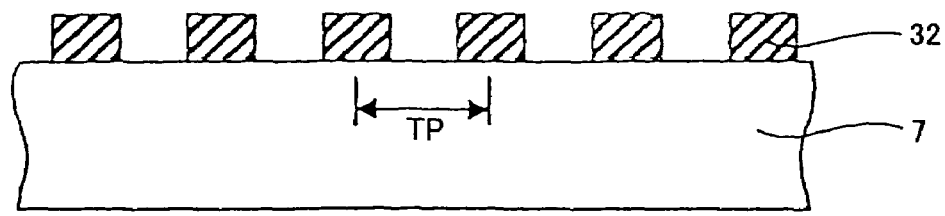
FIG. 50 is a cross section view showing a grooved pattern obtained by etching the mixed layer after etching the mask layer.

In FIG. 50 is shown a cross section structure of the substrate 7 after sputter etching the surface of the substrate 7 and the mixed layer 35 as shown in FIG. 41. By performing sputter etching, the surface roughness of the substrate 7 can be reduced.

The substrate shown in FIG. 50 can also be used as an optical disk master.

The process for producing an optical disk from the optical disk master completed by the production process above is described below. More specifically, a process for producing an optical disk by using the optical disk master shown in FIG. 43 is described below.

Figure 47:
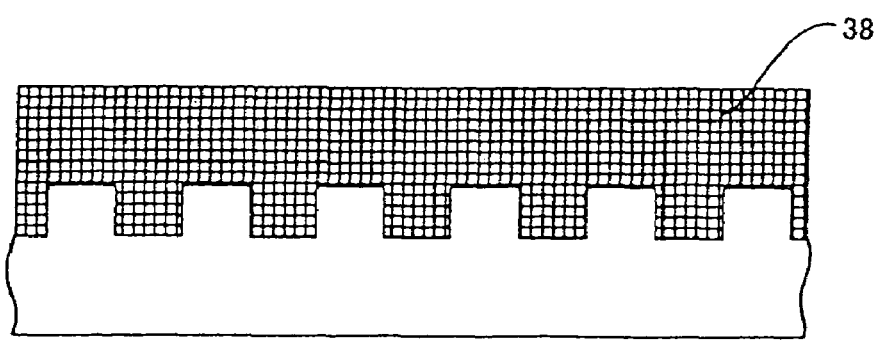
FIG. 47 is a cross section view provided to explain a state in which a resin optical disk substrate is produced from a stamper according to the invention.
Figure 48:
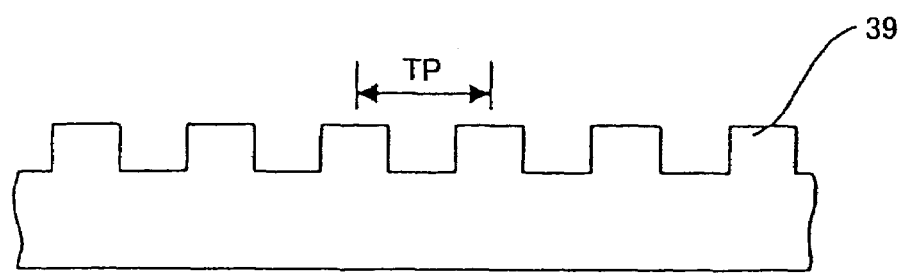
FIG. 48 shows a finished optical disk substrate produced according to the invention.
Figure 49:
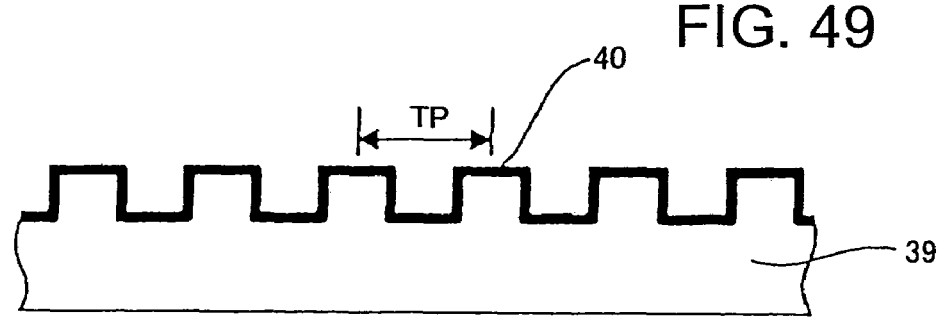
FIG. 49 is a cross section view provided to explain a state in which a recording medium is formed on an optical disk substrate according to the invention.

In the following, the cross section states of the disk are shown. More specifically, FIG. 44 shows the process step for forming an electrode film, FIG. 45 shows a step for forming an Ni electrocasting, FIG. 46 shows a step for forming a stamper by stripping off, FIG. 47 shows a step for molding a resin optical disk substrate, FIG. 48 shows a step for finishing the optical disk substrate, and FIG. 49 shows a step for forming a recording medium.

Figure 44:
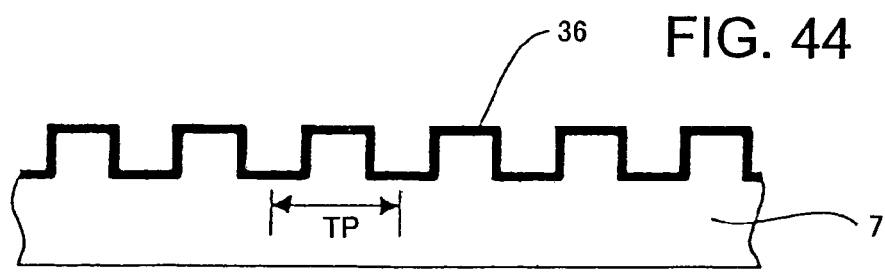
FIG. 44 is a cross section view provided to explain a state in which an electrode film is formed on an optical disk master according to the invention.

Firstly, as shown in FIG. 44, an electrode film 36 to provide an electrode for electrocasting is formed on the surface of the optical disk master by means of sputtering and the like. As the electrode film material, preferred is to use a metal such as Ni, Ta, stainless steel, and the like. Further, to facilitate the stripping off of the stamper from the electrode film 36 in the later step of stripping off the stamper, the surface of the electrode film is subjected to oxidation treatment by means of ashing and the like.

Figure 45:
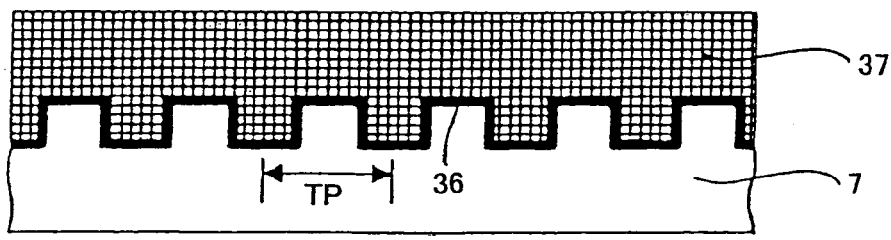
FIG. 45 is a cross section view provided to explain a state in which an Ni electrocasting film is formed on an optical disk master according to the invention.

Then, as shown in FIG. 45, an Ni electrocasting film 37 is formed by carrying out electrocasting of Ni using the electrode film 36 as the electrode.

Figure 46:
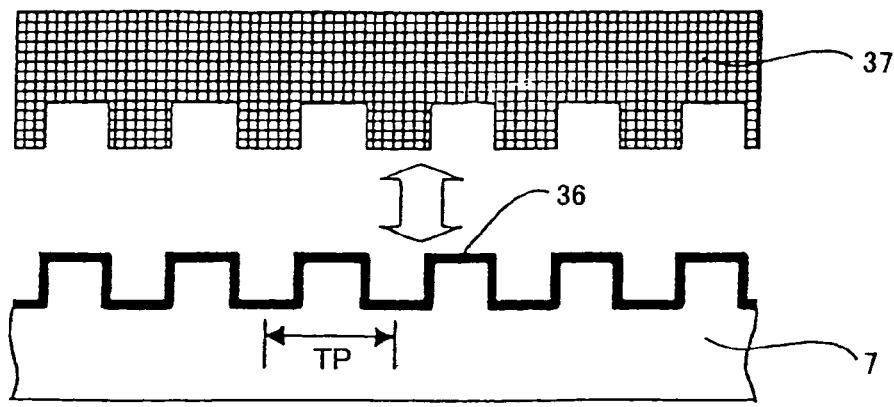
FIG. 46 is a cross section view provided to explain a state in which an Ni electrocasting film is stripped off from an optical disk master according to the invention.

Subsequently, as shown in FIG. 46, after stripping off the Ni electrocasting film 37 from the electrode film 36, the back plane (the side which is not the indentations and protrusions as shown in FIG. 44) of the Ni electrocasting film 37 is subjected to polish treatment. The Ni electrocasting film 37 subjected to polish treatment provides a stamper 38.

As shown in FIG. 47, the stamper 38 is attached thereafter to an injection molding machine, and by injection molding a resin such as polycarbonate, a resin optical disk substrate 39 can be obtained as shown in FIG. 48.

Finally, as shown in FIG. 49, a recording medium 40 is formed on the plane of the optical disk substrate 39 having formed thereon the guide track (i.e., the surface of the substrate having the indentations and protrusions) to obtain a finished optical disk.

The recording medium 40 referred herein is a so-called structured layer consisting of plural layers for recording data; for instance, it may comprise a transparent dielectric layer, a recording layer, a transparent dielectric layer, and a reflection layer laminated in this order.

Thus, the optical disk produced in this manner comprises a rectangular guide track (the protruded portion formed on the surface of the disk shown in FIG. 49) formed at a track pitch TP (e.g., 300 nm) nearly equal to the optical beam spot diameter BS used for laser cutting. Since a rectangular guide track is formed, an optical disk with a narrower track pitch suitable for high density recording and having improved stability in tracking performance can be implemented with high precision by using the optical disk master produced in this manner.

Examples of the optical disk masters and the methods for producing optical disk masters and the like according to the invention are described below.

EXAMPLE 3-1

On a glass substrate 7, Si film was formed at a film thickness of 40 nm as a mask layer 32, and after forming an Al film at a film thickness of 40 nm as a metallic film 33, an AlN film was formed thereon at a film thickness of 44 nm to provide a transparent film 34.

Subsequently, laser cutting was performed. More specifically, a laser radiation 2 emitted at a wavelength of 351 nm from a Kr laser light source 1 was converged and irradiated to the surface of the transparent film 34 by using an objective lens 5 having a numerical aperture NA of 0.95. The optical beam spot diameter BS of the converged laser radiation 2 was found to be approximately 300 nm.

Then, laser cutting was performed at a track pitch TP of 300 nm and at a laser power intensity of 20 mW. In this case, the metallic film 33 and the transparent film 34 provide an antireflection structure with respect to a laser radiation 351 nm in wavelength. Thus was obtained a mixed layer 35 as shown in FIG. 39.

Then, by wet etching using a sodium hydroxide solution, the AlN transparent film 34 and the Al metallic film 33 were removed. In this manner, a mixed layer 35 made of Al and Si were left over as shown in FIG. 40. Further, on observing the thus formed mixed layer 35 under an electron microscope, the pattern width of the remaining mixed layer 35 was found to be about 120 nm. Moreover, an interval TP between the mixed layer 35 is about 300 nm. More specifically, a mixed layer 35 having a track pitch TP equal to that of the optical beam spot diameter BS and a narrower pattern width than the optical beam spot diameter BS was formed.

In the conventional production method described above, the track pitch TP had to be set about twice the beam spot diameter BS to obtain rectangular indentation and protrusion patterns. However, according to the invention, rectangular indentation and protrusion patterns can be implemented even in case the track pitch TP is approximately equal to the beam spot diameter BS.

Subsequently, by using the mixed layer 35 as a mask, dry etching of glass substrate 7 was performed. Thus, the glass substrate 7 was placed inside a dry etching apparatus, $Cl_2$ etching gas (at a flow rate of 150 sccm) was introduced inside the apparatus, and the gas pressure on dry etching was set to 50 mTorr, at which radio frequency power of 400 W was applied, to perform dry etching of Si mask layer 32. Since the mixed layer pattern 35 comprised Si alloydized with Al, etching of the mixed layer hardly proceeded but the Si mask layer 32 alone was etched. A substrate as shown in FIG. 41 was obtained as a result. Then, dry etching of Si substrate 7 was performed by introducing $CF_4$ etching gas at a flow rate of 20 sccm inside the apparatus, and the gas pressure on dry etching was set to 10 mTorr, at which radio frequency power of 500 W was applied. Since the mixed layer pattern 35 comprised Si alloydized with Al, etching of the mixed layer hardly proceeded but the Si substrate 7 alone was etched. Thus, a glass substrate 7 etched to a depth of about 40 nm as shown in FIG. 42 was formed as a result.

Thereafter, the mixed layer pattern 35 was removed by sputter etching, in which gaseous Ar was introduced at a flow rate of 70 sccm inside the apparatus, and while setting the gas pressure was set to 10 mTorr, radio frequency power of 500 W was applied.

Then, the Si mask layer 32 was removed by etching, in which $Cl_2$ etching gas (at a flow rate of 150 sccm) was introduced inside the etching apparatus, and the gas pressure on etching was set to 50 mTorr, at which radio frequency power of 400 W was applied. Thus was formed micropatterns on the optical disk master as shown in FIG. 43.

Subsequently, on the optical disk master, an Ni electrocasting film 16 was formed by sputtering, and after oxidizing the surface of the Ni electrode film 36 by using oxygen plasma, an Ni electrocasting film 37 was formed by electrocasting to obtain a stamper 38. Thus, a recording medium 40, which comprises a transparent dielectric layer, a recording layer, a transparent dielectric layer, and a reflection layer, was sequentially formed on an optical disk substrate 39 prepared by injection molding, and a protective coating layer made of an ultraviolet curable resin was formed thereon. The recording layer above is made from a material capable of recording information with a convergent irradiated laser radiation by using an optical pick up of an optical disk drive, and usable are an magnetooptical recording material or a phase transformation material. Thus was obtained an optical disk as shown in FIG. 49.

EXAMPLE 3-2

In the method for forming micropatterns on the optical disk master described in Example 3-1, the micropatterns are formed by performing etching to the substrate 7, however, the micropatterns can be formed by etching to the mask layer 32.

An example of forming micropatterns by etching the mask layer 32 is described below.

Firstly, similar to Example 3-1, an Si mask layer 32, an Al metallic film 33, and an AlN transparent film 34 were formed in this order, and by applying laser cutting, a mixed layer 35 of Al and Si was formed.

Then, after sequentially removing the AlN transparent film 34 and the Al metallic film 33, dry etching was performed by using the mixed layer 35 comprising Al and Si as a mask. Dry etching was carried out by introducing $Cl_2$ etching gas (at a flow rate of 150 sccm), setting the gas pressure on etching to 50 mTorr, and by applying radio frequency power of 400 W. Since the mixed layer pattern 35 comprised Si with Al mixed therein, etching of the mixed layer hardly proceeded but the Si mask layer 32 alone was etched under the etching conditions as above (FIG. 41).

Thereafter, the mixed layer pattern 35 was removed by sputter etching, in which gaseous Ar was introduced (at a flow rate of 70 sccm), and while setting the gas pressure was set to 10 mTorr, radio frequency power of 500 W was applied. Thus was obtained an optical disk master with micropatterns having indentations and protrusions similar to those obtained in Example 3-1 (FIG. 50).

In Example 3-2, the optical disk master was obtained by removing the mixed layer pattern 35 by sputter etching as shown in FIG. 41, however, it can be used as an optical disk master with the mixed layer pattern 35 still remaining thereon.

However, in order to reduce the noise of the optical disk, it is preferred to perform sputter etching as described above. On measuring the surface roughness at each state by using an atomic force microscope, the surface roughness of the etching plane of the Si substrate 7 in case of not performing sputter etching was found to be 0.27 nm, and in contrast to the surface roughness of 0.88 nm for the mixed layer pattern 35, the etched plane of the Si substrate 7 was found to be reduced to 0.21 nm by performing sputter etching; the surface roughness of the Si substrate 7 obtained after removing the mixed layer pattern 35 was found to be 0.28 nm. That is, the surface roughness of the optical disk master can be reduced by performing sputter etching, and thereby an optical disk with reduced noise can be realized.

EXAMPLE 3-3

In the process for forming micropatterns described in Example 3-1, Si was used as the mask layer 32. However, it is also possible to use a mask layer other than that of Si.

Accordingly, a case of using $SiO_2$ as the mask layer 32 is described in the example below.

Firstly, in a manner similar to that described in Example 3-1, $SiO_2$ film as formed at a film thickness of 40 nm on a glass substrate, and an Al metallic film 33 and an AlN transparent film 34 were formed thereon. Then, a mixed layer 35 of Al and $SiO_2$ was formed by laser cutting.

Thereafter, the AlN transparent film 34 and the Al metallic film 33 were sequentially removed, and dry etching was performed by using the mixed layer 35 of Al and $SiO_2$ as a mask.

Dry etching was carried out by introducing $CF_4$ etching gas (at a flow rate of 20 sccm) at a gas pressure of 10 mTorr, and by applying a high frequency power of 400 W. Under the etching conditions above, etching of the mixed layer pattern 35 hardly proceeded but the $SiO_2$ mask layer 32 alone was etched, because the mixed layer pattern 35 is comprised Al mixed in $SiO_2$ (FIG. 41).

Subsequently, gaseous Ar (at a flow rate of 70 sccm) was introduced, and by setting the gas pressure to 10 mTorr, a high frequency power of 500 W was applied to remove the mixed layer pattern 35 by sputter etching. In this manner, an optical disk master with micropatterns having indentations and protrusions similar to those obtained in Example 3-2 was implemented (FIG. 50).

Further, micropatterns on the optical disk master can be formed by using SiN as the mask layer 32 instead of $SiO_2$.

EXAMPLE 3-4

In the process for forming micropatterns described in Examples 3-1 to 3-3, Al was used as the metallic film 33. However, it is also possible to use a metal other than that Al. For instance, an optical disk master can be formed by using Co by the following process.

In case of using Co as the metallic film 33, a mixed layer pattern 35 comprising Co and Si was formed by laser cutting similar to that described in Example 3-1 (FIG. 39). Then, the AlN transparent film 34 was removed by wet etching using a sodium hydroxide solution, and after removing the sodium hydroxide solution by rinsing with pure water, the Co metallic film 33 was removed by using an aqueous (3HCl/ $H_2O_2$) solution. In this manner, similar to Example 3-1, a mixed layer 35 of Co and Si was left over as shown in FIG. 40.

Then, the glass substrate 7 was placed inside a dry etching apparatus, and by using the mixed layer 35 as a mask, dry etching of the Si mask layer 32 was carried out by introducing $Cl_2$ etching gas at a flow rate of 150 sccm at a gas pressure of 50 mTorr, and by applying a high frequency power of 400 W. Under the etching conditions above, etching of the mixed layer pattern 35 hardly proceeded but the Si mask layer 32 alone was etched, because the mixed layer pattern 35 is comprised Co mixed in Si (FIG. 41).

Further, by carrying out a production process (FIG. 42 and FIG. 43) similar to that described in Example 3-1, micropatterns were formed on optical disk master as shown in FIG. 43.

Micropatterns on the optical disk master can be formed by a similar process by using a 3d transition metal such as Fe or Ni instead of Co.

EXAMPLE 3-5

In Example 3-1, Pd can be used as the metallic film 33. In this case, a mixed layer pattern 35 comprising Pd and Si can be formed by laser cutting. The AlN transparent film 34 was removed by wet etching using a sodium hydroxide solution, after removing the AlN transparent film 34, the sodium hydroxide solution was removed by rinsing with pure water, and the Pd metallic film 33 was removed by using an aqueous ($KI/I_2$) solution. Similar to Example 3-1, a mixed layer 35 of Pd and Si was left over as shown in FIG. 40.

Then, on performing dry etching of the Si mask layer 32 under the conditions similar to those described in Example 3-4, etching hardly proceeded on the mixed layer pattern 35 because Pd is mixed in Si, but the Si mask layer 32 alone was etched (FIG. 41). Further, by carrying out a production process (FIG. 42 and FIG. 43) similar to that described in Example 3-1, micropatterns were formed on optical disk master as shown in FIG. 43.

EXAMPLE 3-6

In Example 3-1, Ti can be used as the metallic film 33. In this case, a mixed layer pattern 35 comprising Ti and Si can be formed by laser cutting. The AlN transparent film 34 was removed by wet etching using a sodium hydroxide solution, after removing the AlN transparent film 34 the sodium hydroxide solution was removed by rinsing with pure water, and the Ti metallic film 33 was removed by using an aqueous ($NH_4OH/H_2O_2$) solution. Similar to Example 3-1, a mixed layer 35 of Ti and Si was left over as shown in FIG. 40.

Then, on performing dry etching of the Si mask layer 32 under the conditions similar to those described in Example 3-4, etching hardly proceeded on the mixed layer pattern 35 because Ti is mixed in Si, but the Si mask layer 32 alone was etched (FIG. 41). Further, by carrying out a production process (FIG. 42 and FIG. 43) similar to that described in Example 3-1, micropatterns were formed on optical disk master as shown in FIG. 43.

EXAMPLE 3-7

The optical disk master produced in accordance with the invention differs from a conventional optical disk master in that the indentations and protrusions are reversed. Accordingly, the indentation and protrusion shapes also result reversed in the optical disk finally. Thus, in Example 3-7, description is made on correcting the reversed indentation and protrusion.

The correction of the reversed indentation and protrusion shapes is explained below. In the present case, a stamper 38 formed after the stripping off step shown in FIG. 47 is used.

Firstly, the surface of the stamper 38 having the guide track thereon is oxidized by oxygen plasma. Thereafter, an Ni electrocasting film 37' is formed on the surface of the formed guide track by using the stamper 38 as the electrode. The plane of the Ni electrocasting film 37' having the indentations and protrusions formed thereon comprises reversed indentations and protrusions of the Ni electrocasting film 37 formed in FIG. 46.

Then, by performing polishing on the back plane after stripping off the stamper 38 from the Ni electrocasting film 37', a work stamper 38' is formed with reversed indentations and protrusions with respect to the stamper 38. By forming an optical disk substrate by injection molding using the work stamper 38', an optical disk substrate having indentation and protrusion structure similar to that of a conventional type and yet having prepits and guide grooves (=150 nm) smaller than the optical beam spot diameter (=about 300 nm) can be obtained.

According to the method for forming micropatterns with accordance to the invention, there can be obtained a substrate having a micropatterns narrower in width than the optical beam spot diameter can be obtained, which can be used not only in the land recording method or a groove recording method in which the information is recorded in either of the indented portion and the protruded portion of the micropattern, but also in a land-groove recording method in which information is recorded on both of the indented portion and the protruded portion.

Thus, according to the invention, by irradiating a converged optical beam to a substrate having a mask layer and a metallic film formed in this order, a mixed layer is formed at the interface between the of the mask layer and the metallic film at the portion increased to a predetermined temperature or higher at the central portion of the optical beam spot. In this manner, a substrate having a micropattern comprising prepits and guide grooves smaller than the optical beam diameter can be produced.

Further, by using the substrate having the micropattern as above, an optical disk master, a stamper for optical disks, and optical disks having narrower track pitch can be produced.

EXAMPLE 4

Heat-Sensitive Multilayer Film

The invention provides a method for forming micropatterns, comprising forming a heat-sensitive multilayer film on the surface of a substrate, forming a mixed film the heat-sensitive multilayer film by elevating the temperature to a predetermined temperature or higher by irradiating a converged optical beam from the upper side of the heat-sensitive multilayer film, and selectively removing the portion of the heat-sensitive multilayer film other than the mixed film, so that the mixed film is left over on the substrate.

In the method above, optical beam is irradiated to a heat-sensitive multilayer film in such a manner that the mixed film is formed in a region smaller than the spot diameter of the convergent irradiated optical beam.

In particular, the heat-sensitive multilayer film has a multilayered structure comprising laminated alternating layers of at least one each of a metallic film and a non-metallic film, and the mixed film is formed by alloydizing the metallic film and the non-metallic film elevated to the predetermined temperature or higher.

Further in the invention, a transparent film may be formed on the heat-sensitive multilayer after forming the heat-sensitive layer and before forming a mixed film. In this case, the heat-sensitive multilayer film and the transparent film preferably provide an antireflection structure with respect to the irradiated converged optical beam.

In the invention, there can be used a substrate made of Si or $SiO_2$, a metallic film made of Al, Co, and Pd, and a non-metallic film made of Si $SiO_2$. However, the invention is not only limited thereto. Furthermore, AlN can be used for the transparent film.

The substrate having micropatterns thus formed can be used as an optical disk master and the like.

Further, after selectively removing a part of the heat-sensitive multilayer film other than the mixed film, the region of the substrate having no mixed film formed thereon may be etched by using the remaining mixed film as a mask.

Furthermore, after etching the substrate above, the remaining mixed film may be selectively removed by sputter etching.

Moreover, by using the optical disk master having the micropattern as above, an optical disk stamper can be produced by forming an electrode film, electrocasting, and polishing the back plane.

Further, by forming an electrocasting film on the surface of the optical disk stamper by using it as an electrode, and by stripping it off from the optical disk stamper, a work stamper for optical disks can be produced.

In addition, by performing injection molding of a resin and by forming a recording layer and the like by using the optical disk stamper, an optical disk can be produced.

A conventional laser cutting apparatus as shown in FIG. 1 is also usable as the laser cutting apparatus for use in the production of an optical disk master according to the invention.

Conventionally used was a glass substrate having directly formed thereon a positive-type photoresist 6. In the invention, however, used is a glass substrate 7 having a heat-sensitive multilayer film formed thereon.

According to the invention, an optical disk master having micropatterns is produced by a method as follows.

The example below refers to an optical disk of a land recording method or a groove recording method, in which the micropatterns formed on the surface of the substrate comprise a pair of an indented portion and a protruded portion to constitute a single track, and in which the information is recorded in either of the indented portion or the protruded portion. According to this method, the length corresponding to the sum of the width of a pair of indented portion and protruded portion is the track pitch TP.

Figure 51:
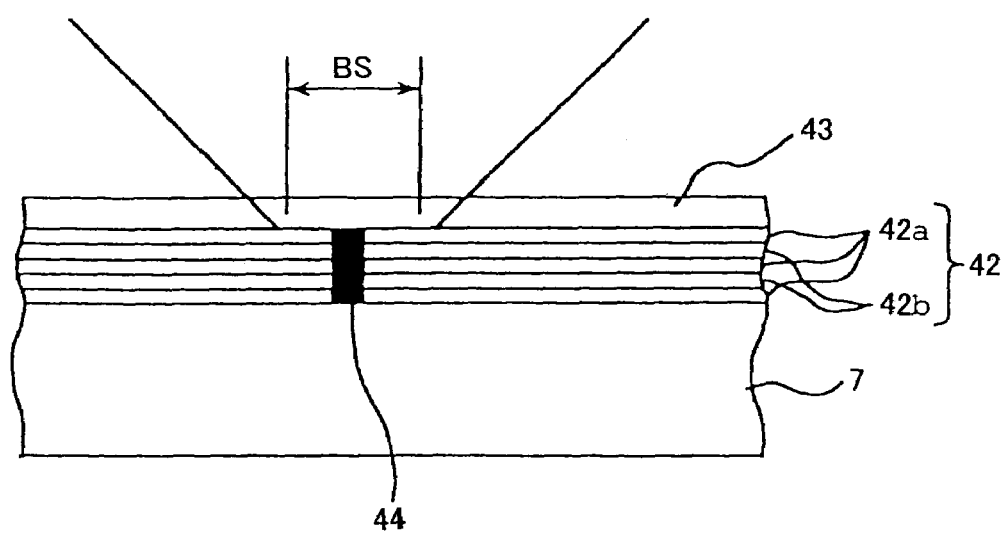
FIG. 51 is a cross section view provided to explain an exposure process of an embodiment of a method for producing an optical disk master according to the invention.

In FIG. 51 is given a schematically drawn explanatory diagram for laser cutting according to the production method for an optical disk master of the invention.

As the optical disk master, there is used a substrate 7 made of glass (quartz) or silicon and the like, having formed thereon a heat-sensitive multilayer film 42 and a transparent film 43 in this order.

In this case, the heat-sensitive multilayer film 42 comprises a multilayer structure comprising two or more layers; for instance, a multilayer structure comprising periodically laminated alternate layers of a metallic film 42a and a non-metallic film 42b. For instance, Al can be used as the metallic film 42a, and for example, Si can be used as the non-metallic film 42b.

In FIG. 51 is shown a structure comprising three metallic films 42a and two non-metallic films 42b arranged in alternate layers. However, the invention is not only limited thereto, and there may also be used a multilayer structure comprising one each of a metallic film and a non-metallic film, or a multilayer structure comprising three or more layers. In the example shown in FIG. 51, for instance, the film thickness of one metallic film 42a may be set to 8 nm, and that of one non-metallic film may be set to 8 nm, while setting the height of the entire heat-sensitive multilayer film 42 to about 40 nm. Further, the film thickness of the transparent film 43 may be set to about 44 nm.

The film thickness of the transparent film 43 must be set in such a manner that it exhibits an antireflective effect with respect to the laser radiation 2 used for the exposure. For instance, a preferred film thickness w of the transparent film 43 is set to $w=(m\lambda)/(4n)$, where m is an odd number, $\lambda$ represents the wavelength of the laser radiation 2, and n represents the refractive index of the transparent film 43. m represents the odd number. There can be used AlN for the transparent film 43.

Figure 52:
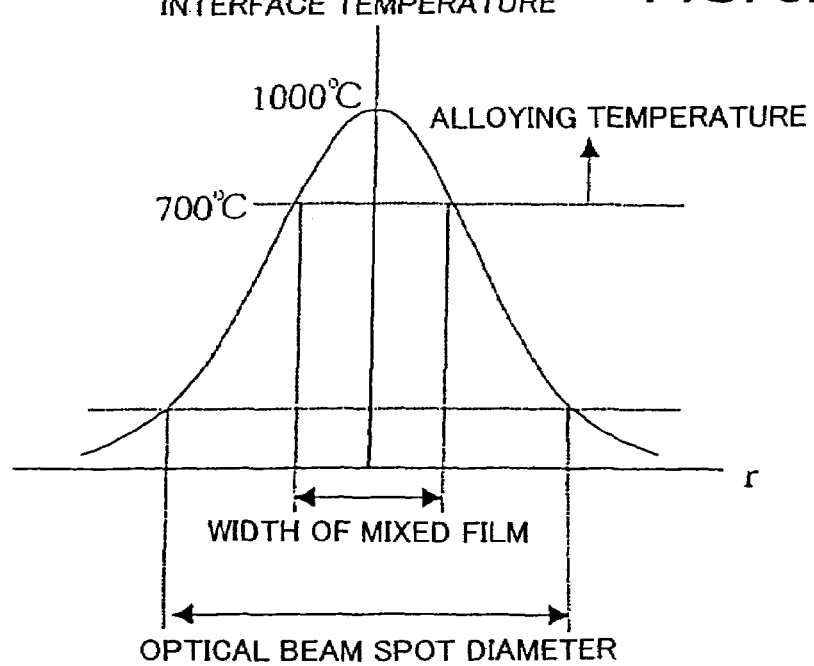
FIG. 52 is an explanatory drawing of a temperature distribution at the boundary with respect to an optical beam spot diameter according to the invention.

By thus providing a transparent film 43 having an antireflection structure formed on the heat-sensitive multilayer film 42, the optical beam 2 is absorbed by the heat-sensitive multilayer film 42, and the transparent film 43. A Gaussian temperature distribution corresponding to the intensity distribution of the optical beam 2 results in the heat-sensitive multilayer film 42. In FIG. 52 is shown an example of a temperature distribution with respect to the spot diameter of the optical beam irradiated to the transparent film 43.

By irradiating an optical beam 2 to the heat-sensitive multilayer film 42, a mixed film 44 comprising an alloydized metallic film 42a and non-metallic film 42b is formed at the portion of the heat-sensitive multilayer film 42 the temperature of which is elevated to a predetermined value or higher.

For instance, in case the optical beam spot diameter BS is set to 300 nm, the temperature distribution shown in FIG. 52 yields a peak of about 1000° C. in the heat-sensitive multilayer film 42, and the width of the region having its temperature elevated to 700° C. or higher, i.e., the width of the mixed film 44, is smaller than the optical beam spot diameter, and is about 120 nm. In FIG. 52, 700° C. is the mixed film forming temperature, i.e., the lower limit for forming the mixed film 44. The formation of the mixed film 44 with such a minute width can be confirmed by means of electron microscope.

The portion of the heat-sensitive multilayer film 42 in the region other than the mixed film 44 is removed by etching performed in the later process step.

Since the heat-sensitive multilayer film 42 is formed by alternately laminating two types of extremely thin films, mixing of the metal and the non-metal proceeds efficiently at the portion the temperature thereof is elevated to a predetermined value or higher. That is, alloydizing occurs uniformly at a high rate in the direction perpendicular to the film from the surface portion to the bottom portion of the heat-sensitive multilayer film 42. Thus, a uniform mixed film having sufficient height as a mask material can be used in the etching of the heat-sensitive multilayer film 42.

Figure 53:
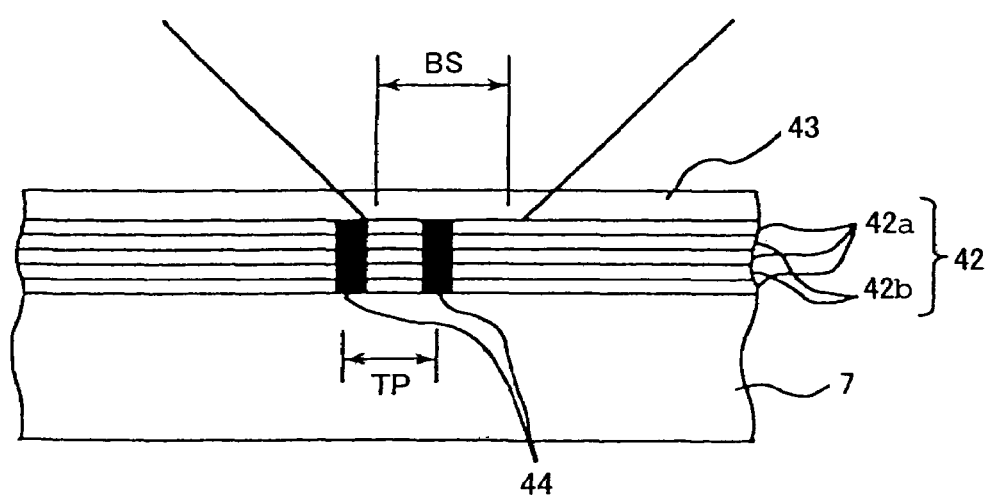
FIG. 53 is a cross section view provided to explain an exposure process of an embodiment of a method for producing an optical disk master according to the invention.

In FIG. 53 is shown a cross section shape in case exposure is performed to the neighboring track having a width of track pitch TP (=300 nm) almost equivalent to that of the optical beam spot diameter BS. Since the width of the region (=150 nm) having its temperature elevated to the mixed film forming temperature or higher is smaller than the optical beam spot diameter BS (=300 nm) in this case, the mixed film 44 is formed separated in the direction of the track.

Figure 54:
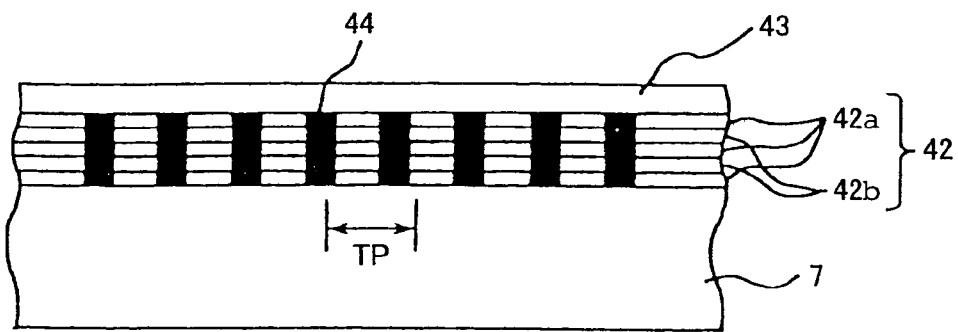
FIG. 54 is a cross section view provided to explain an exposure process of an embodiment of a method for producing an optical disk master according to the invention.

FIG. 54 shows a cross section shape in case the laser cutting above is performed continuously to implement a spiral-like laser cutting. Referring to FIG. 54, the mixed films 44 are aligned inside the heat-sensitive multilayer film 42 uniformly in the vertical direction and separated from each other along the direction of the track. The continuous cutting is carried out by gradually moving the down edge mirror 3-3 and the objective lens 5 shown in FIG. 1.

Figure 55:
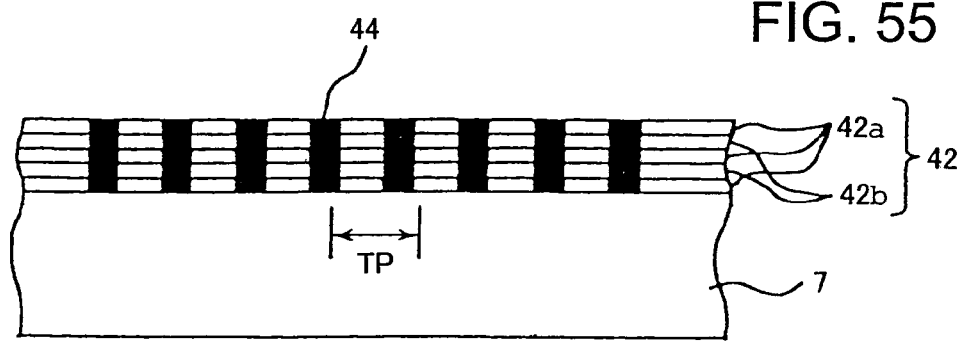
FIG. 55 is a cross section view provided to explain a state after a transparent film is removed in accordance with the invention.

In FIG. 55 is shown the cross section of a state in which the transparent film 43 alone was etched after applying the laser cutting above. Etching can be carried out by using a wet etching solution (e.g., sodium hydroxide) or a dry etching gas (e.g., $CF_4$), which is capable of etching the transparent film 43 alone.

Figure 56:
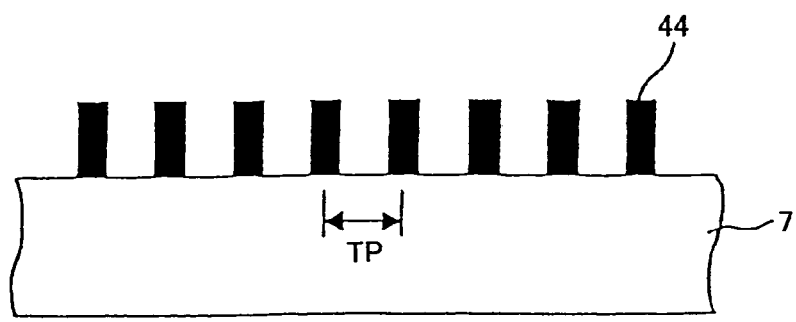
FIG. 56 is a cross section view provided to explain a state after a heat-sensitive multilayer film is removed in accordance with the invention.

In FIG. 56 is shown a cross section shape obtained after removing the heat-sensitive multilayer film 42 of the portion other than the mixed film 44 from the state shown in FIG. 55. The heat-sensitive multilayer film 42 can also be removed by wet etching or dry etching. In case of etching the transparent film 43 and the heat-sensitive multilayer film 42 by using a different method or a different material, the etching must be performed separately; however, in case the same wet etching solution or dry etching gas is used for both films, the process need not be performed in two times, but the transparent film 43 and the heat-sensitive multilayer film 42 can be etched simultaneously.

Referring to FIG. 56, a substrate 7 with a structure having mixed films 44 arranged at an interval of track pitch TP of about 300 nm is formed. The substrate having a structure as shown in FIG. 56 can be used as an optical disk master.

Figure 57:
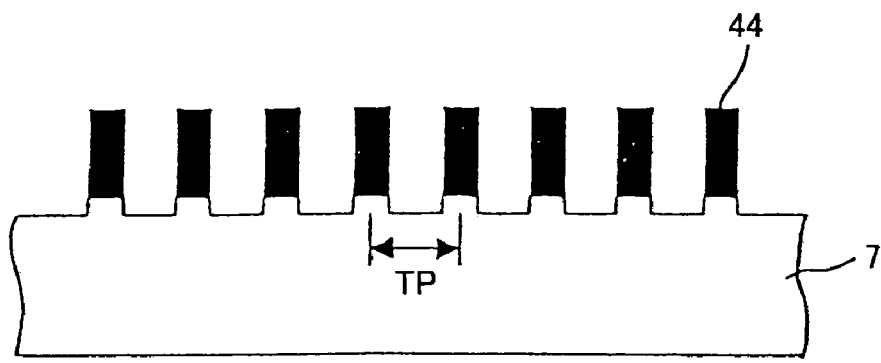
FIG. 57 is a cross section view provided to explain a state in which a substrate surface region having no mixed film formed thereon is etched in accordance with the invention.

Subsequently, with the state shown in FIG. 56, the substrate 7 is etched to a depth of about 40 nm by using the mixed film 44 as a mask (FIG. 57). The etching can be performed by wet etching or dry etching.

Figure 58:
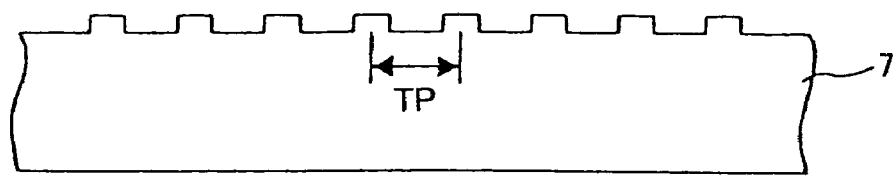
FIG. 58 shows a finished optical disk master produced according to a production process of the invention.

The substrate in the state as shown in FIG. 57 can also be used as an optical disk master. Furthermore, by etching the substrate 7 and the mixed film 44 by means of sputter etching, a substrate 7 having indentations and protrusions on the surface as shown in FIG. 58 is formed. By performing sputter etching, the surface roughness of the substrate 7 shown in FIG. 58 can be reduced, and can also be used as an optical disk master having a micropattern structure with a guide track pitch nearly equal to the track pitch TP.

Then, the process for producing an optical disk from the optical disk master finished by the production process above is described below. More specifically, a process for producing an optical disk using the optical disk master shown in FIG. 58 is described.

Figure 62:
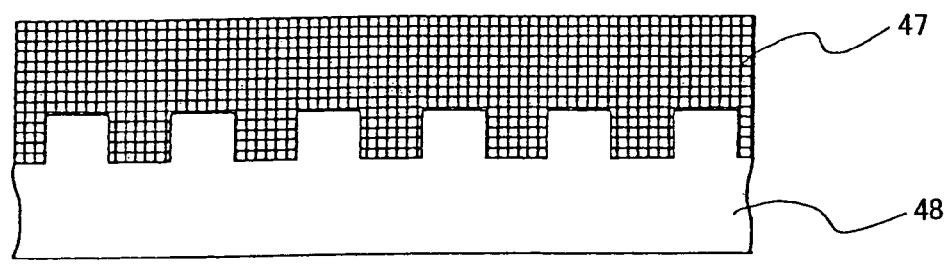
FIG. 62 is a cross section view provided to explain a state in which a resin optical disk substrate is produced from a stamper according to the invention.
Figure 63:
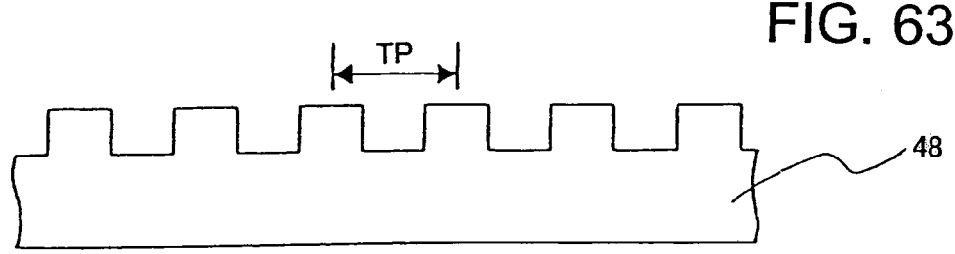
FIG. 63 shows a finished optical disk substrate produced according to the invention.
Figure 64:
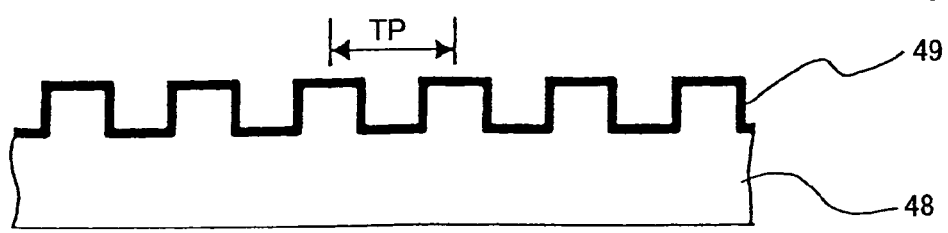
FIG. 64 is a cross section view provided to explain a state in which a recording medium is formed on an optical disk substrate according to the invention.

In the following, the cross section states of the disk are shown. More specifically, FIG. 59 shows the process step for forming an electrode film, FIG. 60 shows a step for forming an Ni electrocasting, FIG. 61 shows a step for forming a stamper by stripping off, FIG. 62 shows a step for molding a resin optical disk substrate, FIG. 63 shows a step for finishing the optical disk substrate, and FIG. 64 shows a step for forming a recording medium.

Figure 59:
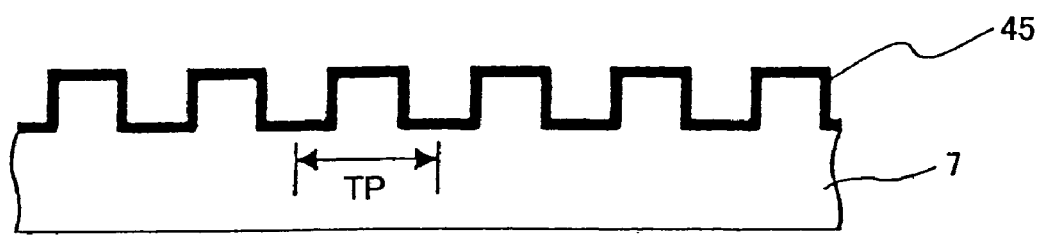
FIG. 59 is a cross section view provided to explain a state in which an electrode film is formed on an optical disk master according to the invention.

Firstly, as shown in FIG. 59, an electrode film 45 to provide an electrode for electrocasting is formed on the surface of the optical disk master by means of sputtering and the like. As the electrode film material, preferred is to use a metal such as Ni, Ta, stainless steel, and the like. Further, to facilitate the stripping off of the stamper from the electrode film 45 in the later step of stripping off the stamper, the surface of the electrode film is subjected to oxidation treatment by means of ashing and the like.

Figure 60:
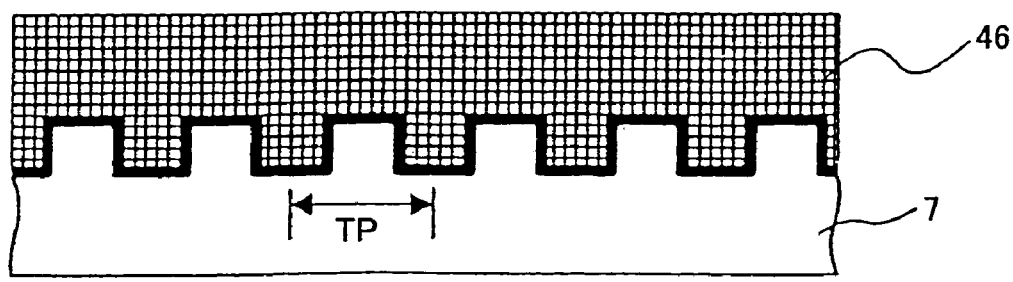
FIG. 60 is a cross section view provided to explain a state in which an Ni electrocasting film is formed on an optical disk master according to the invention.

Then, as shown in FIG. 60, an Ni electrocasting film 46 is formed by carrying out electrocasting of Ni using the electrode film 45 as the electrode.

Figure 61:
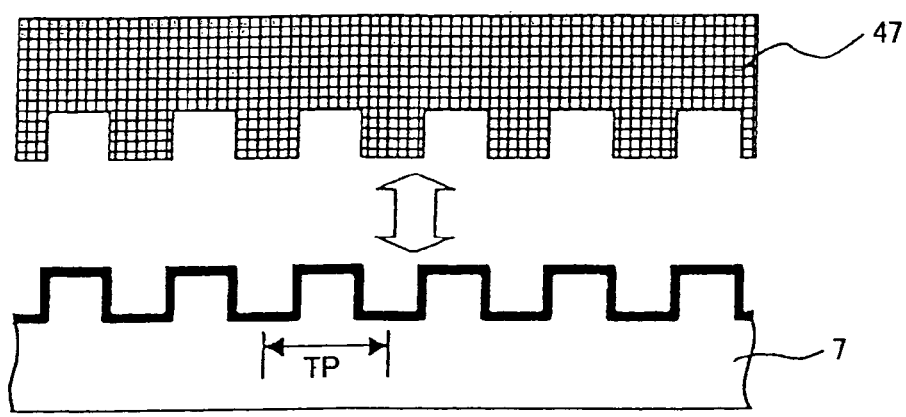
FIG. 61 is a cross section view provided to explain a state in which an Ni electrocasting film is stripped off from an optical disk master according to the invention.

Subsequently, as shown in FIG. 61, after stripping off the Ni electrocasting film 46 from the electrode film 45, the back plane (the side which is not the indentations and protrusions as shown in FIG. 60) of the Ni electrocasting film 46 is subjected to polish treatment. The Ni electrocasting film 46 subjected to polish treatment provides a stamper 47.

As shown in FIG. 62, the stamper 47 is attached thereafter to an injection molding machine, and by injection molding a resin such as polycarbonate, a resin optical disk substrate 48 can be obtained as shown in FIG. 63.

Finally, as shown in FIG. 64, a recording medium 49 is formed on the plane of the optical disk substrate 48 having formed thereon the guide track (i.e., the surface of the substrate having the indentations and protrusions) to obtain a finished optical disk.

The recording medium 49 referred herein is a so-called structured layer consisting of plural layers for recording data; for instance, it may comprise a transparent dielectric layer, a recording layer, a transparent dielectric layer, and a reflection layer laminated in this order.

Thus, the optical disk produced in this manner comprises a rectangular guide track (the protruded portion formed on the surface of the disk shown in FIG. 64) formed at a track pitch TP (e.g., 300 nm) nearly equal to the optical beam spot diameter BS used for laser cutting. Since a rectangular guide track is formed, an optical disk with a narrower track pitch suitable for high density recording and having improved stability in tracking performance can be implemented with high precision by using the optical disk master produced in this manner.

Examples of the optical disk masters and the methods for producing optical disk masters and the like according to the invention are described below.

EXAMPLE 4-1

On a glass substrate 7, a heat-sensitive multilayer film 42 was formed at a film thickness of 40 nm, and an AlN film was formed thereon at a film thickness of 44 nm to provide a transparent film 43 by means of a sputtering method. The heat-sensitive multilayer film 42 comprised Al (with a film thickness of 8 nm) as the metallic film 42a and Si (with a film thickness of 8 nm) as the non-metallic film 42b formed alternately from Al, as to result in a film with a total film thickness of 40 nm.

Subsequently, laser cutting was performed. More specifically, a laser radiation 2 emitted at a wavelength of 351 nm from a Kr laser light source 1 was converged and irradiated to the surface of the transparent film 43 by using an objective lens 5 having a numerical aperture NA of 0.95. The optical beam spot diameter BS of the converged laser radiation 2 was found to be approximately 300 nm.

Then, laser cutting was performed at a track pitch TP of 300 nm and at a laser power intensity of 20 mW. In this case, the heat-sensitive multilayer film 42 and the transparent film 43 provide an antireflection structure with respect to a laser radiation 351 nm in wavelength. Thus was obtained a mixed film 44 as shown in FIG. 54.

Then, by wet etching using a sodium hydroxide solution, the AlN transparent film 43 was removed as shown in FIG. 55. Then, by means of a similar wet etching, the heat-sensitive multilayer film 42 was removed as shown in FIG. 56. As a result, the metallic film 42a and the non-metallic film 42b were removed, and a mixed film 44 made of Al and Si was left over as shown in FIG. 56. Further, through observation under an electron microscope, the pattern width of the remaining mixed layer 14 was found to be about 120 nm.

Thus, a mixed film pattern 44 having a track pitch TP equal to that of the optical beam spot diameter BS and a narrower pattern width than the optical beam spot diameter BS was formed as shown in FIG. 56.

The procedure for removing the AlN transparent film 43 and the heat-sensitive multilayer film 42 by means of wet etching has been described above for an explanatory means, but it may be carried out in a single process step so long as the mixed film pattern 44 is left over.

In the conventional production method described previously, the track pitch TP had to be set about twice the beam spot diameter BS to obtain rectangular indentation and protrusion patterns. However, according to the invention, rectangular indentation and protrusion patterns can be implemented even in case the track pitch TP is approximately equal to the beam spot diameter BS.

Subsequently, by using the mixed film pattern 44 as a mask, dry etching of Si substrate 7 was performed. Thus, the Si substrate 7 was placed inside a dry etching apparatus, a mixed gas of $CF_4$ etching gas (at a flow rate of 50 sccm) and $O_2$ (at a flow rate of 30 sccm) was introduced inside the apparatus, and the gas pressure on dry etching was set to 30 mTorr, at which radio frequency power of 400 W was applied. Since the mixed film pattern 44 is comprised a mixture of Si with Al, etching of the mixed film hardly proceeded but the Si substrate 7 alone was etched under the dry etching conditions above. In this manner, a Si substrate 7 etched to a depth of about 40 nm was formed as shown in FIG. 57.

Subsequently, gaseous Ar was introduced at a flow rate of 70 sccm, and by setting the gas pressure to 10 mTorr, a high frequency power of 500 W was applied to remove the mixed film pattern 44 by sputter etching. In this manner, an optical disk master was implemented as shown in FIG. 58.

Subsequently, on the optical disk master shown in FIG. 58, an Ni electrode film 45 was formed by sputtering, and after oxidizing the surface of the Ni electrode film 45 by using oxygen plasma, an Ni electrocasting film 46 was formed by electrocasting to obtain a stamper 47. Thus, a recording medium 49, which comprises a transparent dielectric layer, a recording layer, a transparent dielectric layer, and a reflection layer, was sequentially formed on an optical disk substrate 48 prepared by injection molding, and a protective coating layer made of an ultraviolet curable resin was formed thereon. The recording layer above is made from a material capable of recording information with a convergent irradiated laser radiation by using an optical pick up of an optical disk drive, and usable are a magnetooptical recording material or a phase transformation material. Thus was obtained an optical disk as shown in FIG. 64.

In the example above, the optical disk master was obtained by removing the mixed film pattern 44 by sputter etching as shown in FIG. 58. However, the state having the mixed film pattern 44 remaining thereon can also be used as an optical disk master.

However, in order to reduce the noise of the optical disk, it is preferred to perform sputter etching as described above. On measuring the surface roughness at each state by using an atomic force microscope, the surface roughness of the etching plane of the Si substrate 7 in case of not performing sputter etching was found to be 0.29 nm, and in contrast to the surface roughness of 0.88 nm for the mixed film pattern 44, the etched plane of the Si substrate 7 was found to be reduced to 0.23 nm by performing sputter etching; the surface roughness of the Si substrate 7 obtained after removing the mixed film pattern 44 was found to be 0.27 nm. That is, the surface roughness of the optical disk master can be reduced by performing sputter etching, and thereby an optical disk with reduced noise can be realized.

EXAMPLE 4-2

An Si substrate was used as the substrate 7 in the process for producing the micropatterns of Example 4-1, but it is possible to use a substrate other than Si substrate. Accordingly, a case of using a quartz ($SiO_2$) substrate as the substrate 7 is described in the example below.

Firstly, in a manner similar to that described in Example 4-1, a heat-sensitive multilayer film 42 and an AlN transparent film 43 were formed on the $SiO_2$ substrate. The heat-sensitive multilayer film 42 comprised Al (with a film thickness of 8 nm) as the metallic film 42a and $SiO_2$ (with a film thickness of 8 nm) as the non-metallic film 42b formed alternately from Al, as to result in a film with a total film thickness of 40 nm. By applying laser cutting to the substrate 7 thus prepared, a mixed film 44 of Al and $SiO_2$ was formed (FIG. 54).

Then, similar to Example 4-1, the AlN transparent film 43 and the heat-sensitive multiplayer film 42 were sequentially removed, and dry etching was performed by using the mixed film 44 of Al and $SiO_2$ as a mask. Dry etching was carried out by introducing $CF_4$ etching gas (at a flow rate of 100 sccm) at a gas pressure of 30 mTorr, and by applying a high frequency power of 400 W.

Under the etching conditions above, etching of the mixed film hardly proceeded but the $SiO_2$ substrate 7 alone was etched, because the mixed film pattern 44 is comprised Al mixed in $SiO_2$ (FIG. 57).

Finally, an optical disk master as shown in FIG. 58 having indentations and protrusions similar to those obtained in Example 4-1 was implemented by performing sputter etching.

EXAMPLE 4-3

In Example 4-2, $SiO_2$ was used as the non-metallic film 42b in the heat-sensitive multilayer film 42 provided on the quartz ($SiO_2$) substrate 7. In the present case, Si as used in Example 4-1 was employed for the non-metallic film 42b.

In Example 4-3, laser cutting was preformed in a manner similar to that described in Example 4-1 to form a mixed film 44 of Al and Si. Subsequently, after sequentially removing the AlN transparent film 43 and the heat-sensitive multilayer film 42 in a manner similar to that described in Example 4-1, the $SiO_2$ substrate 7 alone can be etched by performing dry etching using the mixed film 44 of Al and Si as a mask (FIG. 57).

The dry etching herein can be performed by introducing $CF_4$ etching gas (at a flow rate of 100 sccm) at a gas pressure of 30 mTorr, and by applying a high frequency power of 400 W. Under the etching conditions above, etching of the mixed film pattern 44 hardly proceeds, because the mixed film pattern 44 comprises Al mixed in Si. By finally carrying out sputter etching in a manner similar to that described in Example 4-1, an optical disk master having indentations and protrusions can be obtained similarly to the case of Example 4-1 (FIG. 58).

EXAMPLE 4-4

In the method for forming micropatterns as described in Examples 4-1 and 4-2, Al was used as a metallic film 42a of the heat-sensitive multilayer film 42, however, a metal other than Al may be used. For instance, in case of using Co as the metallic film, an optical disk master can be formed by a process as follows.

In case of using Co as the metallic film 42a in the heat-sensitive multilayer film 42, a mixed film pattern 44 comprising Co and $SiO_2$ was formed by laser cutting in a manner similar to that employed in Example 4-1 (FIG. 54).

The AlN transparent film 43 was removed by wet etching using a sodium hydroxide solution (FIG. 55), and after removing the sodium hydroxide solution by rinsing with pure water, the heat-sensitive multilayer film 42 was removed by using an aqueous ($3HCl/H_2O_2$) solution. In this manner, a mixed film 44 of Co and $SiO_2$ was left over as shown in FIG. 56 in a manner similar to Example 4-1.

Then, the quartz substrate 7 was placed inside a dry etching apparatus, and by using the mixed film pattern 44 as a mask, dry etching was carried out by introducing $CF_4$ etching gas at a flow rate of 100 sccm at a gas pressure of 30 mTorr, and by applying a high frequency power of 400 W. Under the etching conditions above, etching of the mixed film 44 hardly proceeded but the quartz substrate 7 alone was etched, because the mixed film pattern 44 is comprised Co mixed in $SiO_2$ (FIG. 57).

Further, by performing sputter etching similar to that described in Example 4-2, an optical disk master shown in FIG. 58 was produced.

As the metallic film 42a, there can be used a 3d transition metal of Fe or Ni similar to Co to form an optical disk master.

EXAMPLE 4-5

In Example 4-2, Pd can be used as the metallic film 42a constituting the heat-sensitive multilayer film 42. In this case, a mixed film pattern 44 comprising Pd and $SiO_2$ was formed by laser cutting (FIG. 54). The AlN transparent film 43 was removed by wet etching using a sodium hydroxide solution, and after removing the sodium hydroxide solution by rinsing with pure water, the heat-sensitive multilayer film 42 was removed by using an aqueous ($KI/I_2$) solution. Similar to Example 4-1, a mixed layer 14 of Pd and $SiO_2$ was left over as shown in FIG. 56.

Then, on performing dry etching of the quartz substrate 7 under the conditions similar to those described in Example 4-4, etching hardly proceeded on the mixed film pattern 44 because Pd is mixed in $SiO_2$, but the quartz substrate 7 alone was etched. Further, by carrying out sputter etching similar to that described in Example 4-1, optical disk master as shown in FIG. 58 was produced.

EXAMPLE 4-6

The optical disk master shown in FIG. 59 produced in accordance with the invention differs from a conventional optical disk master in that the indentations and protrusions are reversed. Accordingly, the indentation and protrusion shapes also result reversed in the optical disk finally obtained as shown in FIG. 64.

Thus, in Example 4-6, description is made on correcting the reversed indentation and protrusion. In this case, a stamper 47 formed after the stripping off step shown in FIG. 61 is used. Firstly, the surface of the stamper 47 having the guide track thereon is oxidized by oxygen plasma. Thereafter, an Ni electrocasting film 46' is formed on the surface of the formed guide track by using the stamper 47 as the electrode. The plane of the Ni electrocasting film 46' having the indentations and protrusions formed thereon comprises reversed indentations and protrusions of the Ni electrocasting film 46 formed in FIG. 60.

Then, by performing polishing on the back plane after stripping off the stamper 47 from the Ni electrocasting film 46', a work stamper 47' is formed with reversed indentations and protrusions with respect to the stamper 47. By forming an optical disk substrate by injection molding using the work stamper 47', an optical disk substrate having indentation and protrusion structure similar to that of a conventional type and yet having prepits and guide grooves (=150 nm) smaller than the optical beam spot diameter (=about 300 nm) can be obtained.

By employing the method for forming micropatterns according to the present invention, there can be produced a substrate having micropatterns having widths narrower than the optical beam spot diameter for use in, not only a land recording method or a groove recording method in which the information is recorded in either of the indented portion and the protruded portion of the micropattern, but also a land-groove recording method, in which information is recorded on both of the indented portion and the protruded portion.

The method is not only limited to grooves and lands, but is also effective similarly in a pit recording method, in which information is recorded by forming prepits, to realize miniaturized pits.

According to the method for forming micropatterns of the invention, by irradiating a converged optical beam to a substrate having a heat-sensitive multilayer film formed, a mixed film is formed at the portion the temperature of which is elevated to the alloydizing temperature or higher at which the heat-sensitive multilayer film is alloydized at the central portion of the optical beam spot. Hence, a substrate having a micropattern comprising prepits and guide grooves smaller than the optical beam diameter can be produced.

Further, by using the substrate having the micropattern, an optical disk master, a stamper for optical disks, and optical disks having narrower track pitch can be produced.

What is claimed is:

1. A method for forming micropatterns composed of a mixture region of a thin film on a substrate and the substrate, the method comprising the steps of:

irradiating the thin film formed on the substrate with a converged optical beam to elevate the temperature of a portion of the thin film and the substrate within the converged beam to at least a predetermined temperature, the predetermined temperature being such that a mixed film of the thin film and the substrate, is formed in the portion at an interface between the thin film and the substrate, wherein the thin film is formed of a metallic film, and wherein the portion in which the mixed film of the metallic film and the substrate is formed by said irradiating, is smaller than the spot diameter of the irradiated converged optical beam.

2. A method for forming micropatterns composed of a mixture region of a thin film on a substrate and the substrate, the method comprising the steps of:

irradiating the thin film formed on the substrate with a converged optical beam to elevate the temperature of a portion of the thin film and the substrate within the converged optical beam to at least a predetermined temperature, the predetermined temperature being such that a mixed film of the thin film and the substrate, is formed in the portion at an interface between the thing film and the substrate, wherein the thin film is formed of a metallic film and a transparent film formed on the metallic film, and wherein the portion in which the mixed film of the metallic film and the substrate is formed by said irradiating, is smaller than the spot diameter of the irradiated converged optical beam.

3. A method for forming micropatterns composed of a mixed layer of a thin film, the method comprising the steps of:

irradiating the thin film formed on a substrate with a converged optical beam to elevate the temperature of region of the thin film within the converged optical beam to at least a predetermined temperature, wherein the thin film is formed of a mask layer and a metallic film formed on the mask layer, wherein the predetermined temperature is such that the mixed layer of the mask layer and the metallic film is formed in the region whose temperature is elevated by irradiation with the converged optical beam at the interface between the mask layer and the metallic film, and wherein the region in which the mixed layer of the metallic film and the mask layer is formed by said irradiating, is smaller than the spot diameter of the irradiated converged optical beam.

4. A method for forming micropatterns composed of a mixed film formed of a thin film formed of a beat-sensitive multilayer film, the method comprising the steps of:

irradiating the thin film formed on a substrate with a converged optical beam to elevate the temperature of a region of the thin film within the converged optical beam to at least a predetermined temperature, wherein the thin film is formed of the heat-sensitive multilayer film, the heat sensitive multiplayer film being configured such that the mixed film is formed when the temperature of the heat-sensitive multilayer film is elevated to the at least a predetermined temperature, and wherein the region in which the mixed film of the of the heat-sensitive multilayer film is formed by said irradiating, is smaller than the spot diameter of the converged optical beam.

5. A method for forming micropatterns composed of a mixed film formed of a thin film formed of a heat-sensitive multilayer film, the method comprising the steps of:

irradiating the thin film formed on a substrate with a converged optical beam to elevate the temperature of a region of the thin film within the converged optical beam to at least a predetermined temperature, wherein the thin film is formed of the heat-sensitive multilayer film having a multilayered film structure comprising at least one metallic film and at least one non-metallic film witch are alternately laminated, wherein the predetermined temperatures is such that the mixed film of the heat-sensitive multilayer film is formed in the region whose temperature is elevated to the at least the predetermined temperature by irradiation with the converged optical beam, and wherein the region in which the mixed film of the metallic film and the substrate is formed by said irradiating is smaller than the spot diameter of the converged optic beam, and wherein the mixed film is formed in the region by alloydizing the metallic film and the non-metallic film whose temperature is elevated to the at least the predetermined temperature.

* * * * *